United States Patent
Tabata et al.

(10) Patent No.: US 8,418,719 B2
(45) Date of Patent: Apr. 16, 2013

(54) MICROCHANNEL DEVICE

(75) Inventors: Kazuaki Tabata, Kanagawa (JP);
Takayuki Yamada, Kanagawa (JP);
Masaki Hirota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 470 days.

(21) Appl. No.: 11/783,394

(22) Filed: Apr. 9, 2007

(65) Prior Publication Data

US 2008/0017246 A1    Jan. 24, 2008

(30) Foreign Application Priority Data

Jul. 18, 2006   (JP) .................... 2006-195904

(51) Int. Cl.
*F17D 1/14*   (2006.01)
*F16L 41/00*   (2006.01)
*B01F 5/06*   (2006.01)

(52) U.S. Cl.
USPC ...... 137/599.03; 137/3; 137/561 A; 422/68.1; 427/125

(58) Field of Classification Search ............. 137/3, 861, 137/597, 896, 599.03, 561 A, 561 R; 422/68.1; 427/125

See application file for complete search history.

(56) References Cited

U.S. PATENT DOCUMENTS

| | | | |
|---|---|---|---|
| 3,424,437 A | 1/1969 | Shearer | |
| 3,860,217 A | 1/1975 | Grout | |
| 4,050,676 A | 9/1977 | Morishima et al. | |
| 5,061,544 A | 10/1991 | Wada et al. | |
| 5,087,330 A | 2/1992 | Wada et al. | |
| 5,783,129 A * | 7/1998 | Shirai et al. .................. | 264/136 |
| 5,938,333 A | 8/1999 | Kearney | |
| 6,082,891 A | 7/2000 | Schubert et al. | |
| 6,186,660 B1 | 2/2001 | Kopf-Sill et al. | |
| 6,245,249 B1 | 6/2001 | Yamada et al. | |
| 6,355,173 B1 | 3/2002 | Den Bieman et al. | |
| 6,361,824 B1 * | 3/2002 | Yekimov et al. .............. | 427/125 |
| 6,368,871 B1 | 4/2002 | Christel et al. | |
| 6,616,327 B1 * | 9/2003 | Kearney et al. ............... | 366/340 |
| 6,818,394 B1 * | 11/2004 | O'Donnell-Maloney et al. .................................. | 435/6 |
| 7,449,159 B2 | 11/2008 | Nomura et al. | |

(Continued)

FOREIGN PATENT DOCUMENTS

| EP | 1 481 724 A | 12/2004 |
|---|---|---|
| EP | 1 577 000 A2 | 9/2005 |

(Continued)

OTHER PUBLICATIONS

Office Action issued in JP Application No. 2006-195904 on Nov. 30, 2010 (with English translation).

(Continued)

*Primary Examiner* — Craig Schneider
*Assistant Examiner* — Atif Chaudry
(74) *Attorney, Agent, or Firm* — Oliff & Berridge, PLC

(57) ABSTRACT

A microchannel device includes; a microchannel that forms two or more different fluids as a multiphase flow, and a section shape of the multiphase flow having in at least one portion a first shape in which plural polygons are two-dimensionally arranged, and adjacent to one another, a second shape in which a polygon is inscribed in one of a circle and an ellipse, or circumscribes one of a circle and an ellipse, or a third shape in which at least plural circles and polygons are two-dimensionally arranged, and adjacent to one another.

6 Claims, 33 Drawing Sheets

U.S. PATENT DOCUMENTS

| | | | |
|---|---|---|---|
| 8,147,121 | B2 | 4/2012 | Lacy et al. |
| 2002/0058332 | A1* | 5/2002 | Quake et al. ............... 435/288.3 |
| 2003/0008308 | A1 | 1/2003 | Enzelberger et al. |
| 2004/0213083 | A1* | 10/2004 | Fujiwara et al. ............... 366/336 |
| 2005/0163701 | A1 | 7/2005 | Tonkovich et al. |
| 2005/0167354 | A1 | 8/2005 | Caze et al. |
| 2005/0207952 | A1* | 9/2005 | Mae ............................. 422/188 |
| 2005/0207953 | A1 | 9/2005 | Upadhye et al. |
| 2006/0073080 | A1 | 4/2006 | Tonkovich et al. |
| 2006/0140829 | A1 | 6/2006 | Tabata et al. |
| 2006/0159601 | A1 | 7/2006 | Yamada et al. |
| 2006/0272722 | A1 | 12/2006 | Yamada et al. |
| 2007/0062856 | A1 | 3/2007 | Pahl et al. |
| 2007/0139451 | A1* | 6/2007 | Somasiri et al. ............. 346/138 |
| 2007/0183933 | A1 | 8/2007 | Kawazoe et al. |
| 2007/0256736 | A1 | 11/2007 | Tonkovich et al. |
| 2007/0286795 | A1 | 12/2007 | Chiba et al. |
| 2008/0226519 | A1 | 9/2008 | Mae |
| 2008/0245745 | A1 | 10/2008 | Ward et al. |
| 2009/0130025 | A1 | 5/2009 | Bohmer et al. |
| 2010/0008179 | A1 | 1/2010 | Lacy et al. |
| 2010/0068366 | A1 | 3/2010 | Tonkovich et al. |

FOREIGN PATENT DOCUMENTS

| | | |
|---|---|---|
| EP | 1 767 268 A2 | 3/2007 |
| JP | A-50-2256 | 1/1975 |
| JP | B-H06-37291 | 5/1994 |
| JP | 09-512742 | 12/1997 |
| JP | 10-512197 | 11/1998 |
| JP | A 10-305488 | 11/1998 |
| JP | A-2000-506432 | 5/2000 |
| JP | A-2000-238000 | 9/2000 |
| JP | A 2001-509728 | 7/2001 |
| JP | 2002-527250 | 8/2002 |
| JP | A-2002-292274 | 10/2002 |
| JP | A-2003-194806 | 7/2003 |
| JP | A-2004-154648 | 6/2004 |
| JP | A 2004-223637 | 8/2004 |
| JP | A-2004-330008 | 11/2004 |
| JP | 2004-344877 | 12/2004 |
| JP | A 2004-344877 | 12/2004 |
| JP | A-2004-354180 | 12/2004 |
| JP | A-2004-358602 | 12/2004 |
| JP | A-2005-028267 | 2/2005 |
| JP | A-2005-072652 | 3/2005 |
| JP | A-2005-144634 | 6/2005 |
| JP | A-2005-152763 | 6/2005 |
| JP | 2005-262053 | 9/2005 |
| JP | A-2005-246294 | 9/2005 |
| JP | 2006-015254 | 1/2006 |
| JP | A-2006-061870 | 3/2006 |
| JP | 2006-088077 | 4/2006 |
| JP | A-2006-095515 | 4/2006 |
| JP | 2006-150347 | 6/2006 |
| JP | A-2006-161717 | 6/2006 |
| JP | A-2006-167612 | 6/2006 |
| JP | A-2006-187684 | 7/2006 |
| JP | A-2006-187685 | 7/2006 |
| JP | A-2006-272231 | 10/2006 |
| JP | A-2006-272232 | 10/2006 |
| JP | A-2006-305505 | 11/2006 |
| JP | A-2006-341140 | 12/2006 |
| JP | A-2007-100072 | 4/2007 |
| JP | A-2007-105667 | 4/2007 |
| JP | A-2007-519510 | 7/2007 |
| JP | 2007-252979 | 10/2007 |
| JP | A-2007-260678 | 10/2007 |
| JP | T-2008-514428 | 5/2008 |
| JP | A-2008-168173 | 7/2008 |
| WO | WO 95/30476 | 11/1995 |
| WO | WO 95/30476 A1 | 11/1995 |
| WO | WO 97/14497 | 4/1997 |
| WO | WO 00/22436 | 4/2000 |
| WO | WO 2006/039568 A1 | 4/2006 |
| WO | WO 2006/046202 A1 | 5/2006 |
| WO | WO 2006/087655 A1 | 8/2006 |

OTHER PUBLICATIONS

Apr. 9, 2012 Office Action issued in U.S. Appl. No. 12/185,464.
Sep. 26, 2011 Office Action issued in Japanese Application No. 2007-275991 (with translation).
May 24, 2011 Office Action issued in Japanese Patent Application No. 2009-063109 (with translation).
Feb. 24, 2011 Office Action issued in Japanese Patent Application No. 2009-063109 (with translation).
Takei et al. "Sub-Nano Litter Micro Batch Operation Systems With Multi-Step Laplace Pressure Valves Prepared by Photocatalytic Analog Lithography", The 10$^{th}$ International Conference on Miniaturized Systems for Chemistry and Life Science, Nov. 5-9, 2006, pp. 245-247, Tokyo, Japan.
Hideo Yoshida; "Surface Tension", Proceedings of the TEDCOF. '01, Journal Society of Mechanical Engineers, 2001, pp. 1-5.
Oct. 17, 2011 Office Action issued in U.S. Appl. No. 12/196,783.
Oct. 27, 2009 Office Action issued in U.S. Appl. No. 11/905,931.
Mar. 22, 2010 Office Action issued in U.S. Appl. No. 11/905,931.
May 11, 2011 Office Action issued in U.S. Appl. No. 11/905,931.
Sep. 16, 2011 Office Action issued in U.S. Appl. No. 11/905,931.
Miyashita et al. "Sonic Crystal Waveguide—Numerical Simulations and Experiments", Technical Report of the Institute of Electronics, Information and Communication Engineers, Jun. 2001, pp. 33-39 (with abstract).
Mizukoshi et al. "25$^{th}$ Lecture Summary of Surface Science Lecture Convention", The Surface Science Society Japan, Nov. 14, 2005 (with translation).
Jan. 21, 2011 Office Action issued in U.S. Appl. No. 12/185,464.
Jul. 18, 2011 Office Action issued in U.S. Appl. No. 12/185,464.
Xu Ji et al. "A Centrifugation-Enhanced High-Efficiency Micro-Filter with Spiral Channel", Transducers & Eurosensors '07. The 14$^{th}$ International Conference on Solid-State Sensors, Actuators and Microsystems, Lyon, France, Jun. 10-14, 2007, pp. 1865-1868.
Oct. 5, 2010 Office Action issued in Japanese Patent Application No. 2008-292428 (with translation).
Jan. 28, 2011 Office Action issued in U.S. Appl. No. 12/422,528.
May 17, 2011 Office Action issued in U.S. Appl. No. 12/422,528.
Oct. 18, 2011 Office Action issued in Japanese Patent Application No. 2007-266414 (with translation).
U.S. Appl. No. 12/196,783 in the name of Tabata et al., filed Aug. 22, 2008.
U.S. Appl. No. 12/575,136 in the name of Takahashi et al., filed Oct. 7, 2009.
U.S. Appl. No. 12/185,464 in the name of Tabata et al., filed Aug. 4, 2008.
U.S. Appl. No. 12/422,528 in the name of Hongo et al., filed Apr. 13, 2009.
U.S. Appl. No. 11/905,931 in the name of Yamada et al., filed Oct. 5, 2007.
Feb. 16, 2012 Office Action issued in U.S. Appl. No. 12/196,783.
Jun. 4, 2012 Office Action issued in U.S. Appl. No. 11/905,931.
May 22, 2012 Office Action issued in Japanese Patent Application No. 2007-080768 (with translation).
Sep. 20, 2012 Office Action issued in U.S. Appl. No. 12/575,136.
Jan. 23, 2013 Office Action issued in U.S. Appl. No. 12/575,136.

* cited by examiner

A    B  C

C  A  B

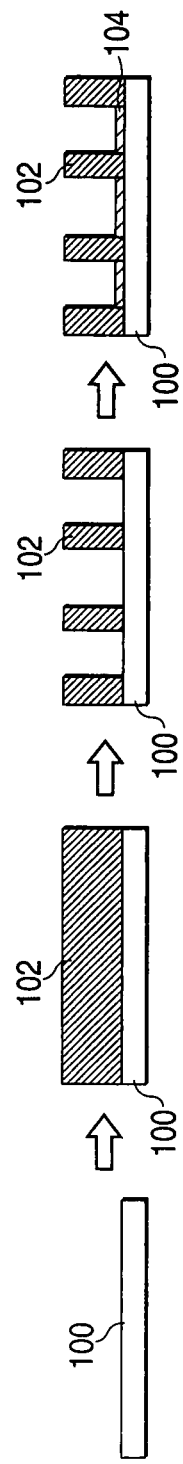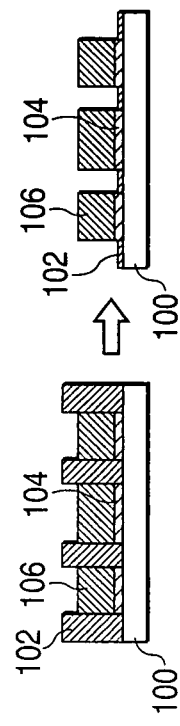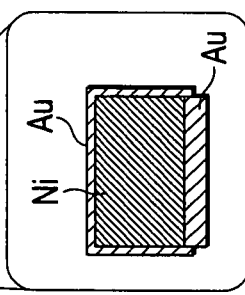

MICROCHANNEL DEVICE

CROSS-REFERENCE TO RELATED APPLICATIONS

This application is based on and claims priority under 35 U.S.C. 119 from Japanese Patent Application No. 2006-195904 filed Jul. 18, 2006.

BACKGROUND

1. Technical Field

The present invention relates to a microchannel device.

2. Related Art

A microelement or microdevice is typified by a microreactor which is usually defined as "device which is produced by using microprocessing, and in which a reaction is performed in a microchannel having an equivalent diameter of 500 μm or less". In the case where such an element or device is applied, for example, to a technique of analyzing, synthesizing, extracting, or separating a material, there are many advantages of high-mix low-volume production, high efficiency, low environmental load, etc. Recently, therefore, such an element or device is expected to be applied to various fields.

SUMMARY

According to an aspect of the present invention, a microchannel device comprising: a microchannel that forms two or more different fluids as a multiphase flow, and a section shape of the multiphase flow having in at least one portion a first shape in which plural polygons are two-dimensionally arranged, and adjacent to one another, a second shape in which a polygon is inscribed in one of a circle and an ellipse, or circumscribes one of a circle and an ellipse, or a third shape in which at least a plurality of circles and polygons are two-dimensionally arranged, and adjacent to one another.

BRIEF DESCRIPTION OF THE DRAWINGS

Exemplary embodiment of the present invention will be described in detail based on the following figures, wherein:

FIGS. 20A to 20I are sectional and enlarged sectional views showing an example of steps of producing pattern layers on a donor substrate by the Au surface coating Ni electroforming method;

DETAILED DESCRIPTION

Hereinafter, the invention will be described in detail with reference to the accompanying drawings.
(Microchannel Device)

The microchannel device of the invention has a microchannel for forming two or more different fluids as a multiphase flow, and is characterized in that a section shape of the multiphase flow has in at least one portion (1) a shape in which plural polygons are two-dimensionally arranged, and adjacent to one another, (2) a shape in which a polygon is inscribed in a circle or an ellipse, or circumscribes a circle or an ellipse, or (3) a shape in which plural circles and/or polygons are two-dimensionally arranged, and adjacent to one another.

In the invention, "multiphase flow" means a flow in which two or more different fluids are in a laminar flow state, and adjacent to one another. The "multiphase flow" is also called "multilayer flow". Fluids in the multiphase flow are not particularly restricted as far as they can flow. For example, all of two or more different fluids may be liquids, part of the fluids may be a gas, or the fluids may be liquids containing a gas or a solid.

The section shape of the multiphase flow means a section shape in a plane perpendicular to the flow direction of the microchannel. The section shape of the multiphase flow means a section shape which is obtained immediately after the multiphase flow is formed. It is a matter of course that, after the formation of the multiphase flow, the multiphase flow may be caused not to be further formed, by mixture, reaction, or the like of the two or more different fluids.

Figure 1:
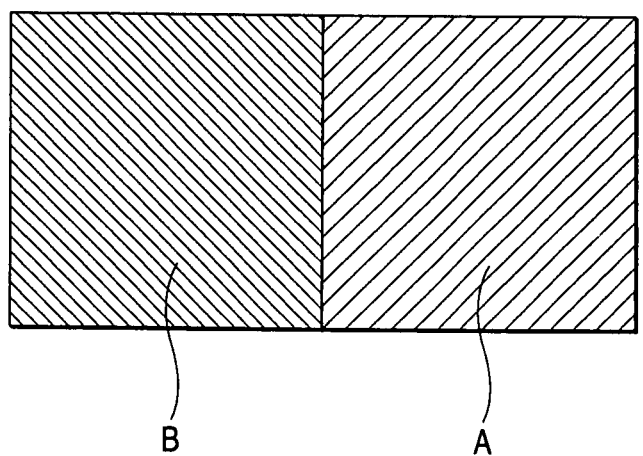
FIG. 1 is a sectional diagram showing an example of a section shape of a multiphase flow formed by a conventional microchannel device.

As a section shape of a multiphase flow formed by a conventional microchannel device, for example, a shape such as shown in FIG. 1 in which two regular tetragons are contacted at one side with each other, a shape of concentric circles as disclosed in JP-A-2004-344877, and the like are known.

By contrast, in the microchannel device of the invention, the section shape of the multiphase flow to be formed has in at least one portion (1) a shape in which plural polygons are two-dimensionally arranged, and adjacent to one another, (2) a shape in which a polygon is inscribed in a circle or an ellipse, or circumscribes a circle or an ellipse, or (3) a shape in which plural circles and/or polygons are two-dimensionally arranged, and adjacent to one another. Therefore, different fluids can be caused to be efficiently contacted with each other. Furthermore, many interfaces where fluids are contacted with one another can be formed in the inside of the multiphase flow which is not affected by a partition wall, and therefore the invention is preferable.

In the invention, "a shape in which plural polygons are two-dimensionally arranged, and adjacent to one another" means a shape in which plural polygons are two-dimensionally arranged, and adjacent at one side to one another, and specifically a shape such as shown in FIGS. 2 to 10 which will be described later in detail.

Hereinafter, "a shape in which plural polygons are two-dimensionally arranged, and adjacent to one another" is often referred to merely as "a polygon arrangement shape".

The polygons in the polygon arrangement shape may be polygons of three or more sides. In accordance with the number of kinds of fluids to be mixed, the mixture ratio, or the like, desired polygons may be selected. From the viewpoints of simplicity of structure and efficiency of production, triangles, tetragons, or hexagons are preferable.

Preferably, the polygons in the section shape are regular polygons because a polygon arrangement shape using many polygons can be easily formed. More preferably, the polygons are regular triangles, regular tetragons, or regular hexagons. Particularly preferably, all the polygons are regular triangles, regular tetragons, or regular hexagons. In the case where two kinds of fluids are to be mixed, it is desirable that the polygons in the section shape are tetragons, and, in the case where three kinds of fluids are to be mixed, it is desirable that the polygons in the section shape are hexagons.

One polygon arrangement shape may be configured by plural kinds of polygons, or by a single kind of polygons.

In each of the polygons, the lengths of the sides may be equal to or different from one another. Among the polygons, the lengths of the sides may be equal to or different from one another. In two adjacent polygons, the lengths of adjacent sides may be equal to or different from each other.

The number of the polygons arranged in the polygon arrangement shape is preferably three or more, more preferably four or more, and further preferably 10 to 1,000. When the number is in the range, the invention can be most effective.

A shape in which the whole outer periphery of one polygon in the polygon arrangement shape is surrounded by another polygon under constant area is preferable because interfaces where different fluids are contacted with one another can be efficiently increased.

From the viewpoints of space reduction, increase of interfaces where different fluids are contacted with one another, and the like, the polygon arrangement shape is preferably configured so as to have a shape in which plural polygons are arranged so that the length of the outer periphery of the polygon arrangement shape is shortest.

Specific examples of the polygon arrangement shape are the shapes shown in FIGS. 2 to 10. However, the polygon arrangement shape is not restricted to them.

Figure 2:
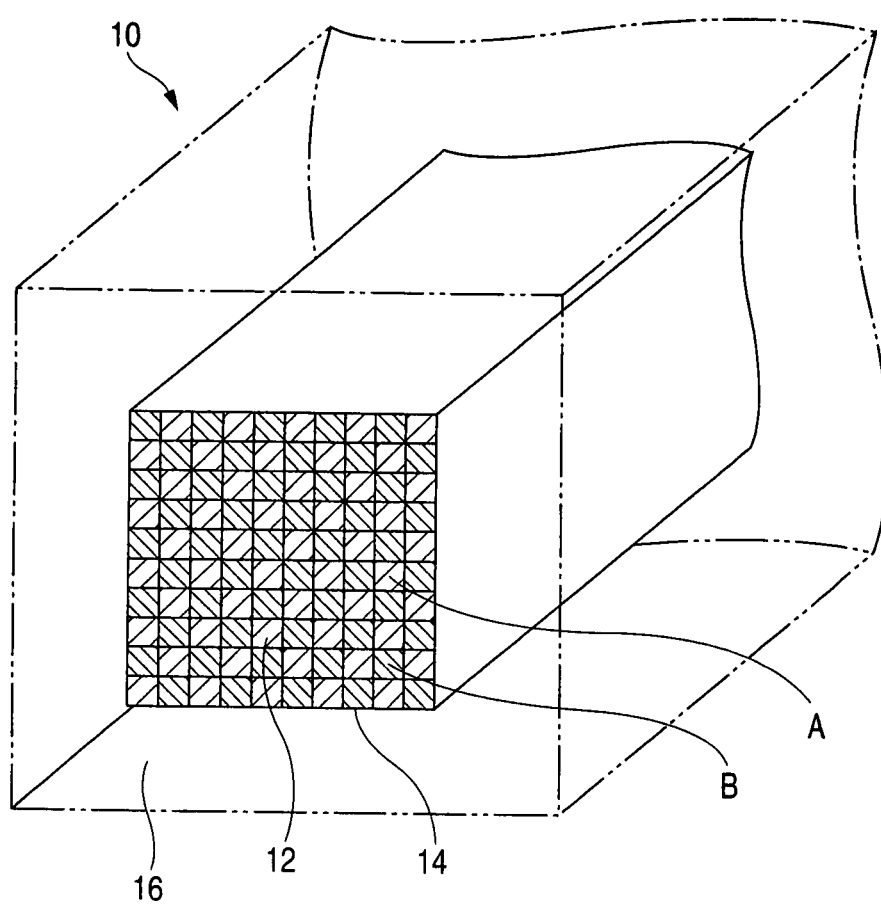
FIG. 2 is a sectional diagram of an example of the microchannel device of the invention, and obtained by cutting a portion where a multiphase flow is formed.

FIG. 2 is a sectional diagram of an example of the microchannel device of the invention, and obtained by cutting a portion where a multiphase flow is formed.

FIGS. 3 to 10 are sectional diagrams respectively showing examples of the section shape of a multiphase flow formed by the microchannel device of the invention.

In a microchannel device 10 shown in FIG. 2, a multiphase flow a section shape of which is in a polygon arrangement shape 12 is contacted with an inner wall 14 of a microchannel, and the microchannel is formed by a structural material portion 16.

In the polygon arrangement shape 12 in the microchannel device 10 shown in FIG. 2, 10×10 rectangular section shapes are arranged vertically and horizontally. The polygon arrangement shape shows the case where two different fluids A and B flow. In the microchannel device in which such a multiphase flow section is formed, the two different fluids can uniformly form interfaces.

Figure 3:
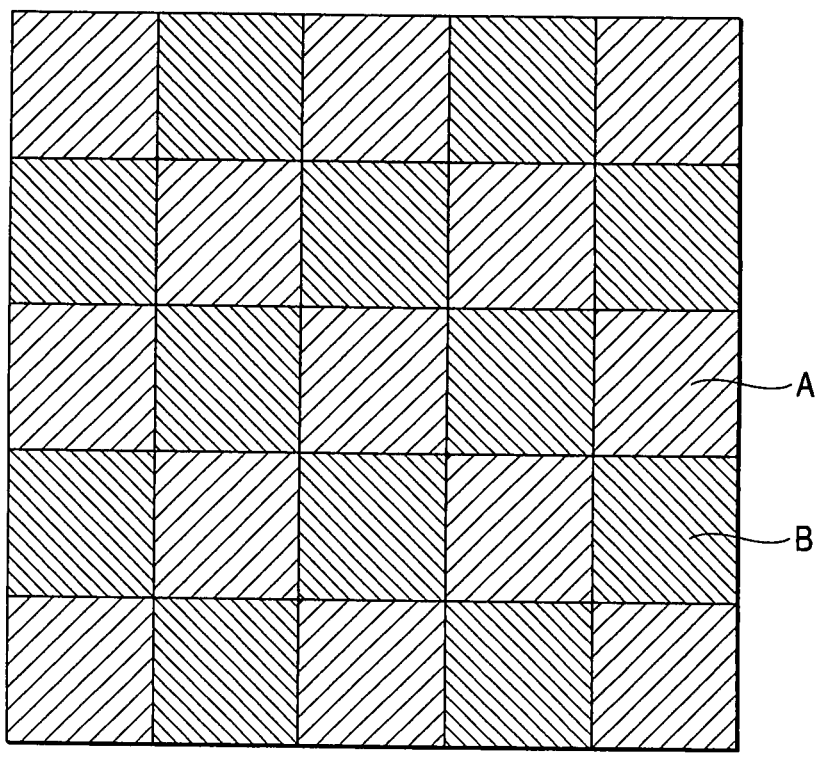
FIG. 3 is a sectional diagram showing an example of a section shape of a multiphase flow formed by the microchannel device of the invention.

The section shape of the multiphase flow shown in FIG. 3 shows an example in which 5×5 tetragons are arranged vertically and horizontally, and two different fluids A and B flow. The fluid A flows through thirteen tetragons, and the fluid B flows through twelve tetragons. As in the microchannel device in which such a multiphase flow section is formed, two or more different fluids may not flow in equal ratios. In accordance with the kinds of fluids, the mixture ratio, or the like, the ratio may be adequately selected.

In the case where the polygons in the polygon arrangement shape are tetragons, particularly regular tetragons (squares), it is preferable to use two different fluids, or four different fluids. Under the above-described conditions, different fluids can easily form uniform interfaces. Therefore, the configuration is preferable.

Figure 4:
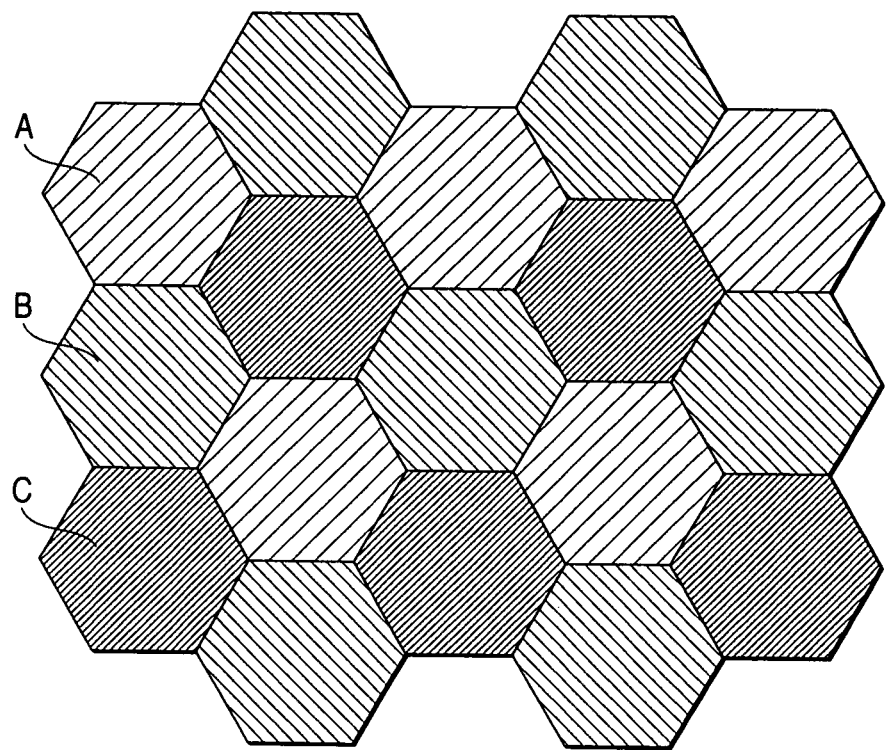
FIG. 4 is a sectional diagram showing another example of the section shape of the multiphase flow formed by the microchannel device of the invention.

The section shape of the multiphase flow shown in FIG. 4 shows an example in which seventeen hexagons are arranged vertically and horizontally, and three different fluids A to C flow.

In the case where the polygons in the polygon arrangement shape are hexagons, particularly regular hexagons, it is preferable to use three different fluids. Under the above-described conditions, a point where three fluids are evenly contacted with one another can be easily formed by three contacting hexagons. Therefore, the configuration is preferable.

Figure 5:
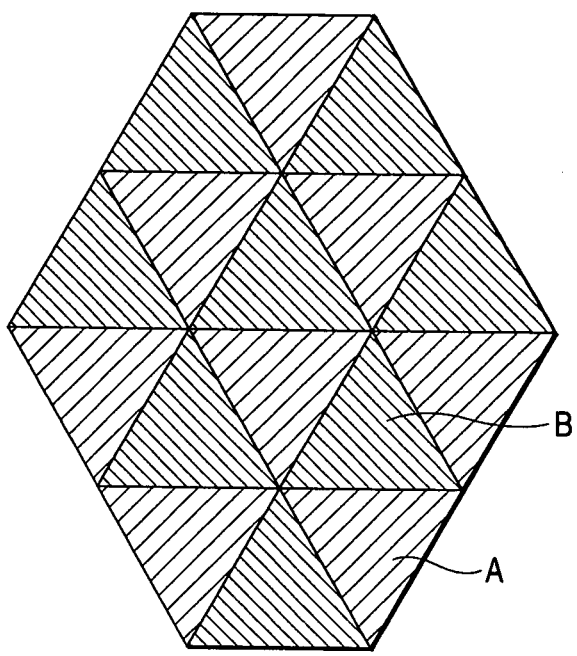
FIG. 5 is a sectional diagram showing a further example of the section shape of the multiphase flow formed by the microchannel device of the invention.

The section shape of the multiphase flow shown in FIG. 5 shows an example in which sixteen triangles are arranged vertically and horizontally, and two different fluids A and B flow. In the microchannel device in which such a multiphase flow section is formed, the two different fluids can uniformly form interfaces.

Figure 6:
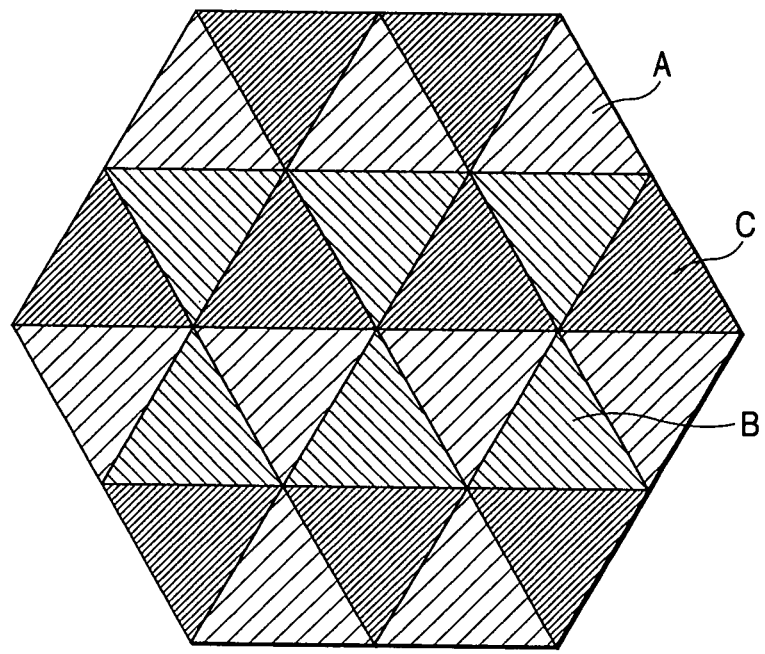
FIG. 6 is a sectional diagram showing a still further example of the section shape of the multiphase flow formed by the microchannel device of the invention.

The section shape of the multiphase flow shown in FIG. 6 shows an example in which twenty-four triangles are arranged vertically and horizontally, and three different fluids A to C flow. In the microchannel device in which such a multiphase flow section is formed, a point where three different fluids are evenly contacted with one another can be easily formed by six contacting triangles. Therefore, the configuration is preferable.

Figure 7:
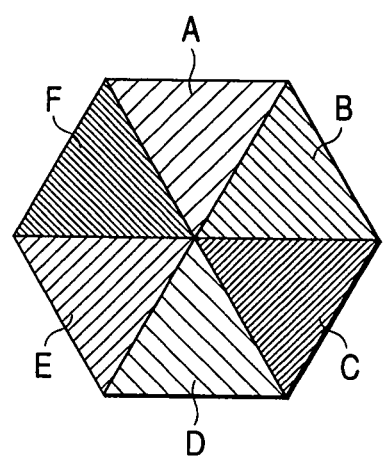
FIG. 7 is a sectional diagram showing a still further example of the section shape of the multiphase flow formed by the microchannel device of the invention.

The section shape of the multiphase flow shown in FIG. 7 shows an example in which six triangles are arranged vertically and horizontally, and six different fluids A to F flow. In the microchannel device in which such a multiphase flow section is formed, a point where six different fluids are evenly contacted with one another can be easily formed by six contacting triangles. Therefore, the configuration is preferable.

In the case where the polygons in the polygon arrangement shape are triangles, particularly regular triangles, it is preferable to use two different fluids, three different fluids, or six different fluids. Under the above-described conditions, different fluids can easily form uniform interfaces. Therefore, the configuration is preferable.

Figure 8:
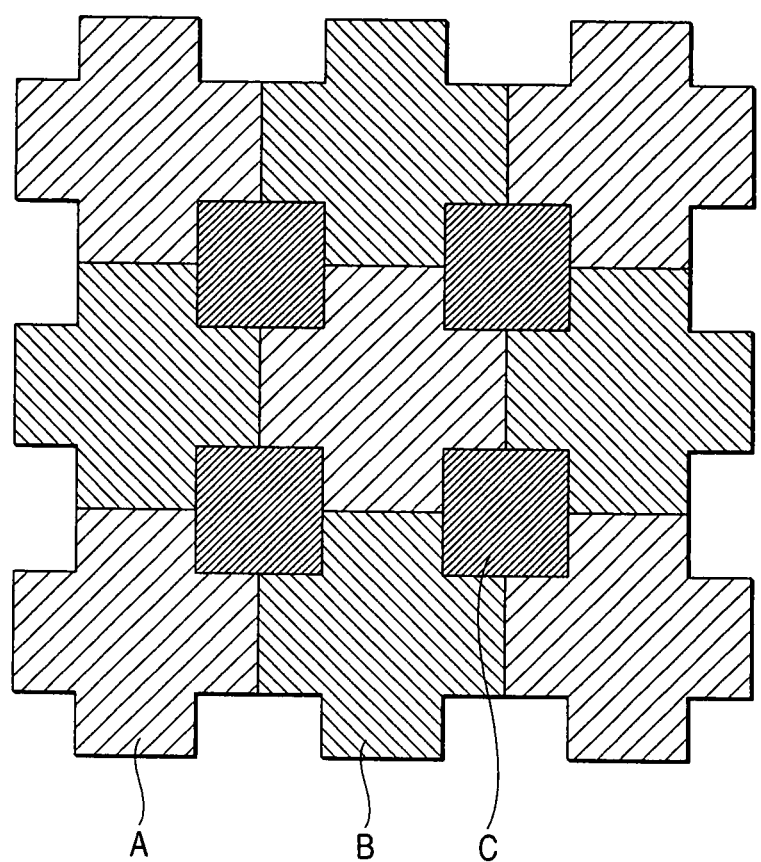
FIG. 8 is a sectional diagram showing a still further example of the section shape of the multiphase flow formed by the microchannel device of the invention.

The section shape of the multiphase flow shown in FIG. 8 shows an example in which nine cross-like dodecagons are arranged vertically and horizontally so as to form four tetragons each surrounded by four dodecagons, and three different fluids A to C flow.

Figure 9:
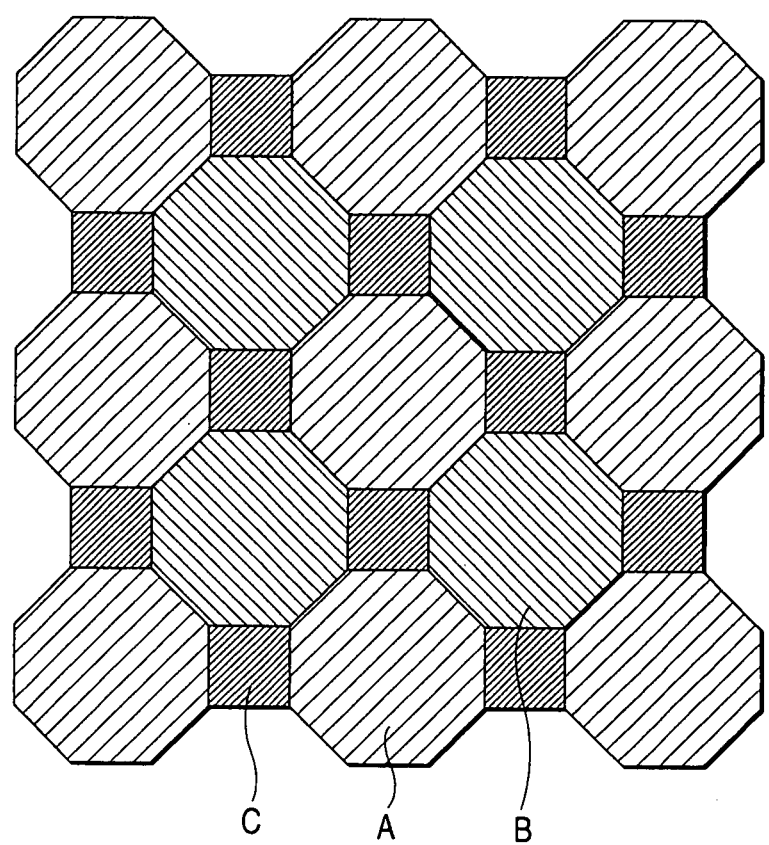
FIG. 9 is a sectional diagram showing a still further example of the section shape of the multiphase flow formed by the microchannel device of the invention.

The section shape of the multiphase flow shown in FIG. 9 shows an example in which thirteen octagons are arranged vertically and horizontally so as to form twelve tetragons each adjacent to three or four octagons, and three different fluids A to C flow.

Figure 10:
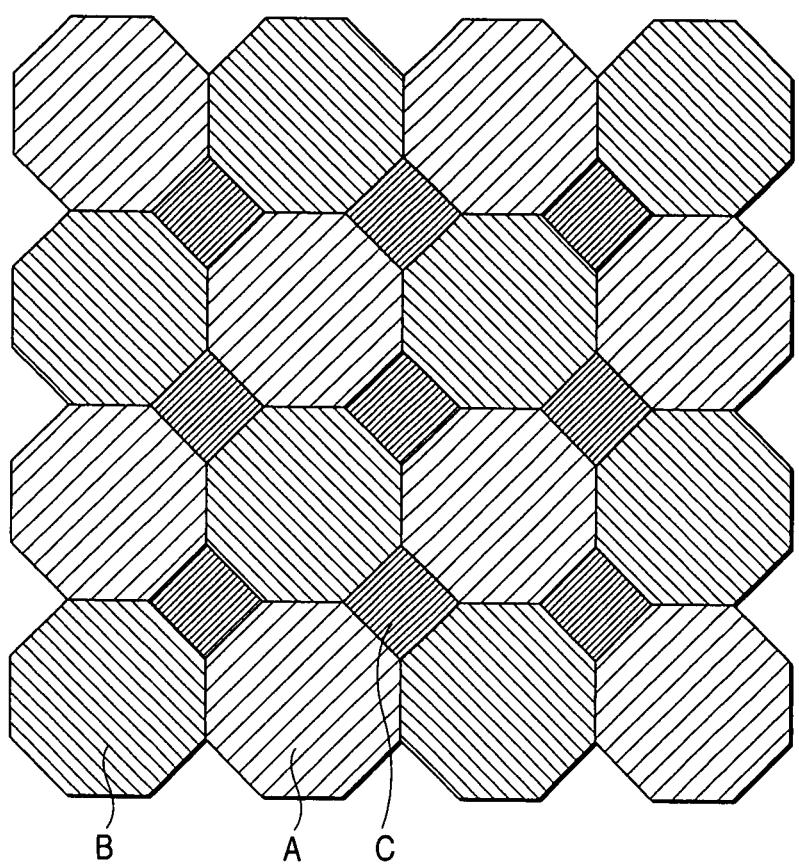
FIG. 10 is a sectional diagram showing a still further example of the section shape of the multiphase flow formed by the microchannel device of the invention.

The section shape of the multiphase flow shown in FIG. 10 shows an example in which sixteen octagons are arranged vertically and horizontally so as to form nine tetragons each surrounded by four octagons, and three different fluids A to C flow.

In this way, the section shape of the multiphase flow in the invention may have a shape in which two or more kinds of polygons are two-dimensionally arranged.

In the invention, "a shape in which a polygon is inscribed in a circle or an ellipse, or circumscribes a circle or an ellipse" means a shape in which all apexes of a polygon inside a circle or an ellipse are contacted with the circle or the ellipse, or a circle or an ellipse is contacted with all sides of a polygon.

Hereinafter, "a shape in which a polygon is inscribed in a circle or an ellipse, or circumscribes a circle or an ellipse" is often referred to merely as "a circle inscribing/circumscribing shape".

Figure 11:
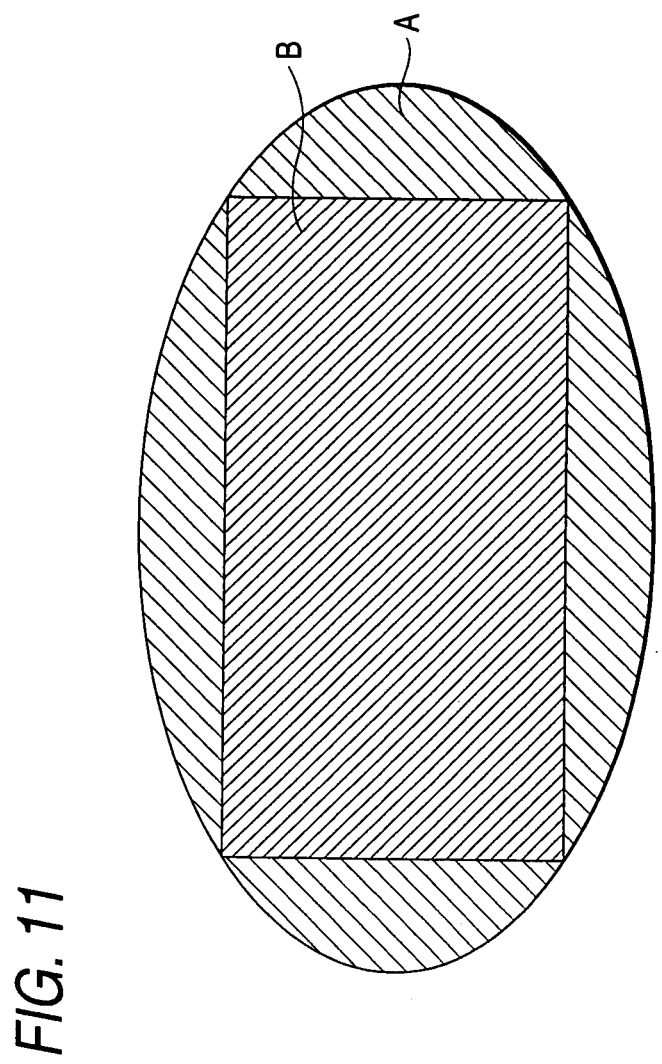
FIG. 11 is a sectional diagram showing a still further example of the section shape of the multiphase flow formed by the microchannel device of the invention.
Figure 12:
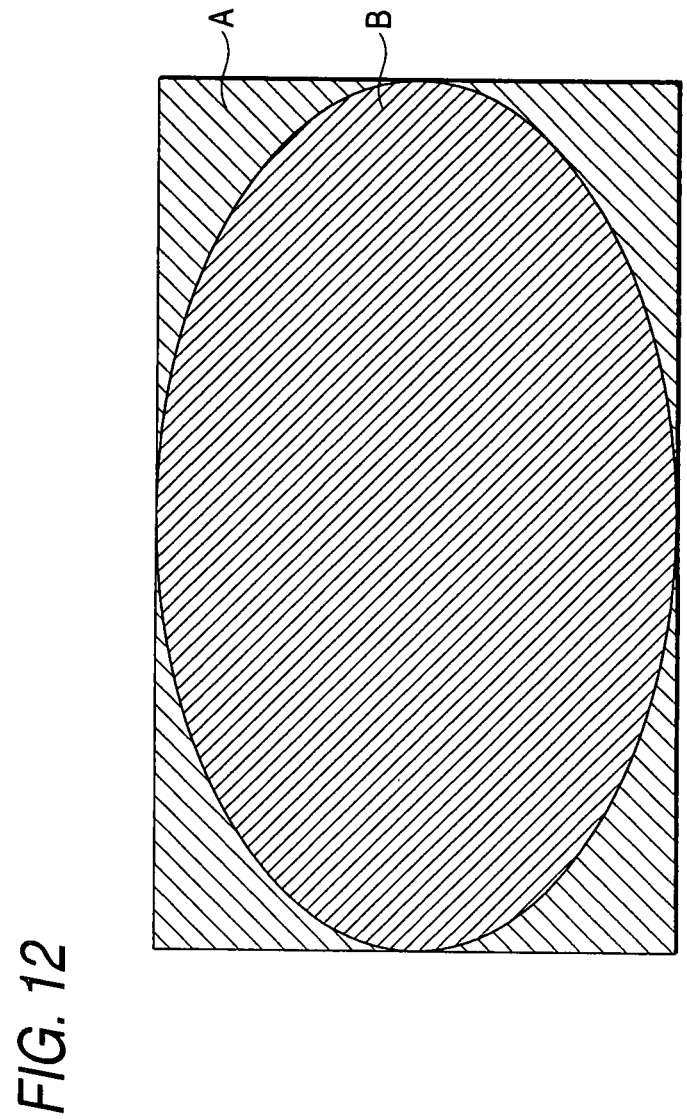
FIG. 12 is a sectional diagram showing a still further example of the section shape of the multiphase flow formed by the microchannel device of the invention.

Specific examples of the circle inscribing/circumscribing shape are shapes such as shown in FIGS. 11 and 12. However, the shape is not restricted to them.

FIGS. 11 and 12 are sectional diagrams respectively showing examples of the section shape of a multiphase flow formed by the microchannel device of the invention.

The section shape of the multiphase flow shown in FIG. 11 shows an example in which a tetragon is inscribed in an ellipse, and two different fluids A and B flow. When the multiphase flow has a section shape such as shown in FIG. 11, four different fluids can flow through four portions enclosed by the sides of the inscribing tetragon and the arcs, respectively, and two different fluids can flow through two sets of two portions enclosed by two opposite sides of the inscribing tetragon and the arcs, respectively.

The section shape of the multiphase flow shown in FIG. 12 shows an example in which a tetragon circumscribes an ellipse, and two different fluids A and B flow. When the multiphase flow has a section shape such as shown in FIG. 12, four different fluids can flow through four portions enclosed by the sides of the circumscribing tetragon and the arcs, respectively, and two different fluids can flow through two sets of two portions which are on a diagonal line in the four portions, respectively.

The polygons in the circle inscribing/circumscribing shape may be polygons of three or more sides. In accordance with the number of kinds of fluids to be mixed, the mixture ratio, or the like, desired polygons may be selected. From the viewpoints of simplicity of structure and efficiency of production, triangles, tetragons, or hexagons are preferable.

Figure 13:
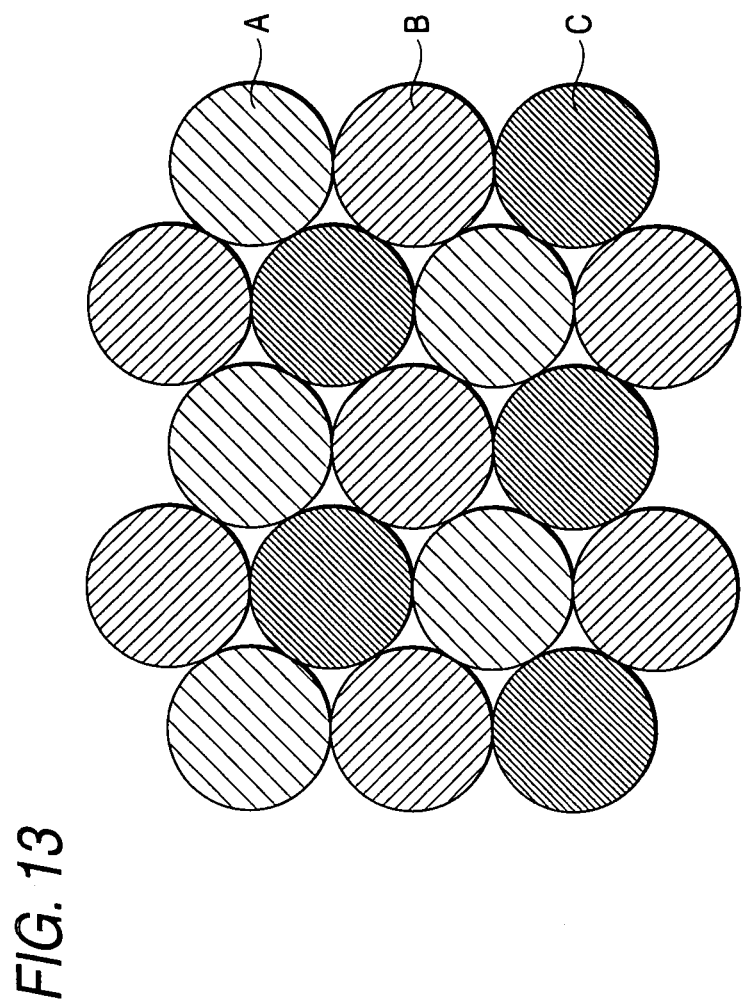
FIG. 13 is a sectional diagram showing a still further example of the section shape of the multiphase flow formed by the microchannel device of the invention.
Figure 14:
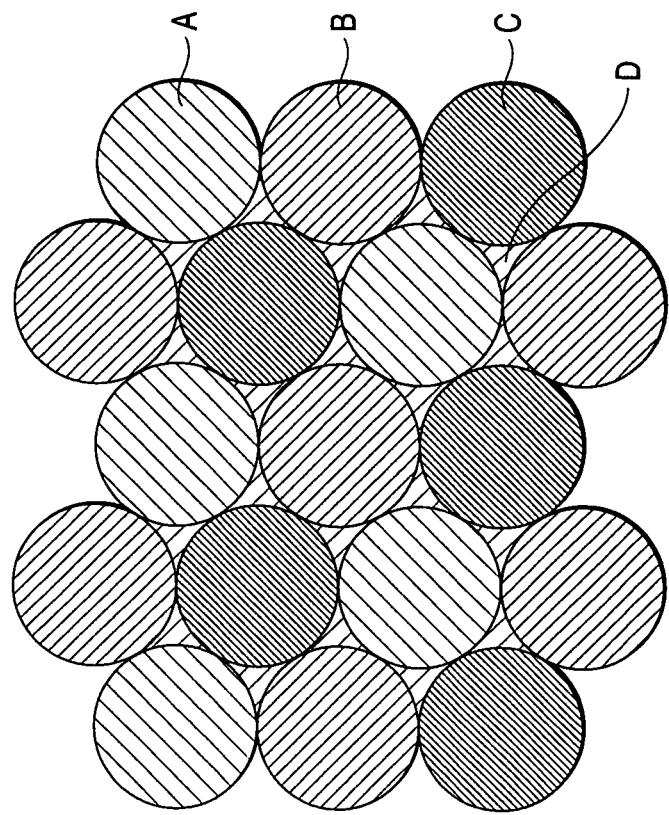
FIG. 14 is a sectional diagram showing a still further example of the section shape of the multiphase flow formed by the microchannel device of the invention.

In the invention, "a shape in which plural circles and/or polygons are two-dimensionally arranged, and adjacent to one another" means a shape in which plural circles and/or polygons are two-dimensionally arranged, and the circles and/or polygons are adjacent at arcs to one another, and specifically a shape such as shown in FIG. 13 or 14 which will be described later in detail.

Hereinafter, "a shape in which plural circles and/or polygons are two-dimensionally arranged, and adjacent to one another" is often referred to merely as "a circle arrangement shape".

A specific example of the circle arrangement shape is a shape such as shown in FIG. 13 or 14. However, the shape is not restricted to them.

FIGS. 13 and 14 are sectional diagrams respectively showing examples of the section shape of a multiphase flow formed by the microchannel device of the invention.

The section shape of the multiphase flow shown in FIG. 13 shows an example in which seventeen circles are arranged vertically and horizontally so as to be adjacent to one another, and three different fluids A to C flow. The fluid A flows through five circles, the fluid B flows through seven circles, and the fluid C flows through five circles. The portions each of which is surrounded by three circles are structural material portions. In the microchannel device in which such a multiphase flow section is formed, mixture or the like can be uniformly performed by interfaces where two or more different fluids are contacted with one another, and without causing a case where three different fluids are simultaneously contacted with one another.

The section shape of the multiphase flow shown in FIG. 14 shows an example in which seventeen circles are arranged vertically and horizontally, twenty portions each surrounded by three circles are formed, and four different fluids A to D flow. The fluid A flows through five circles, the fluid B flows through seven circles, the fluid C flows through five circles, and the fluid D flows through twenty portions each configured by three arcs. In the microchannel device in which such a multiphase flow section is formed, many interfaces can be formed, and mixture or the like can be uniformly performed.

As shown in FIGS. 13 and 14, the portions surrounded by plural arcs formed by a shape in which plural polygons circles and/or ellipses are two-dimensionally arranged, and adjacent to one another may be formed as structural material portions or parts of a channel in accordance with desired usage.

Figure 15:
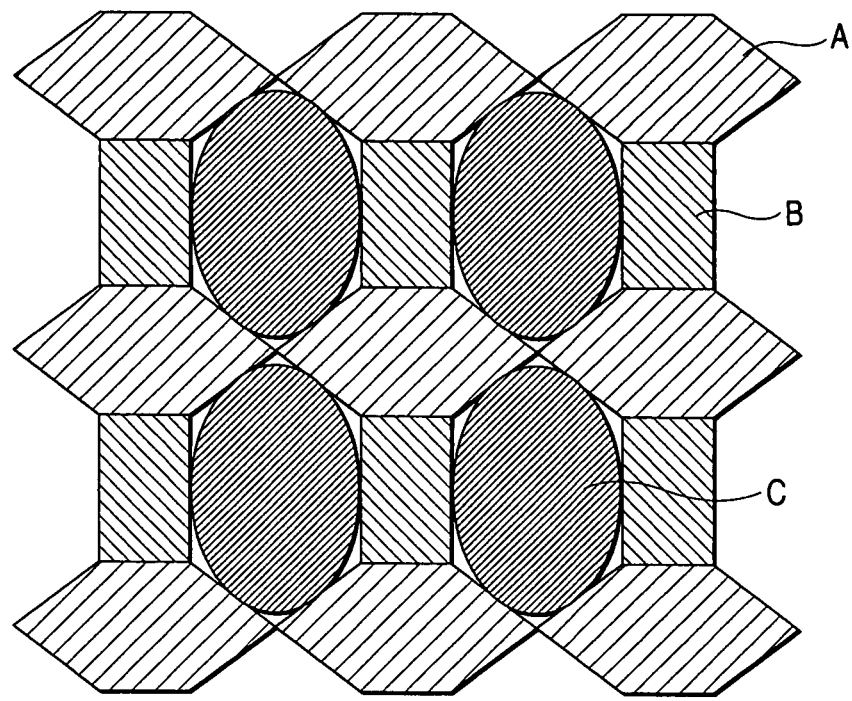
FIG. 15 is a sectional diagram showing a still further example of the section shape of the multiphase flow formed by the microchannel device of the invention.
Figure 16A:
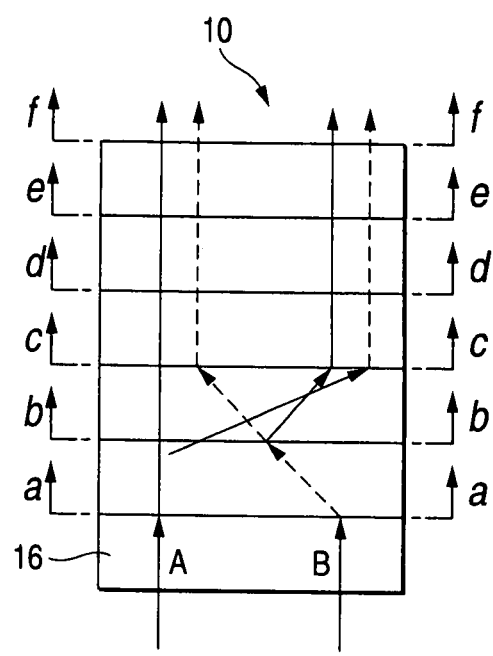
FIGS. 16A to 16G are enlarged diagrams showing a structure for forming the multiphase flow in an example of the microchannel device of the invention.
Figure 16B:
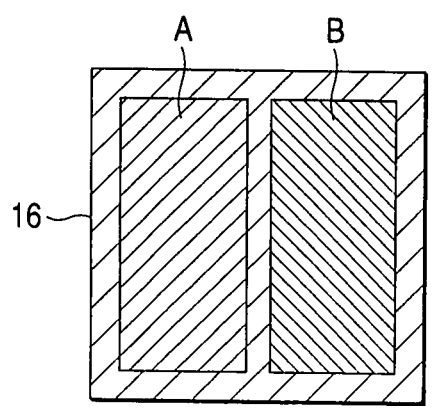
Figure 16C:
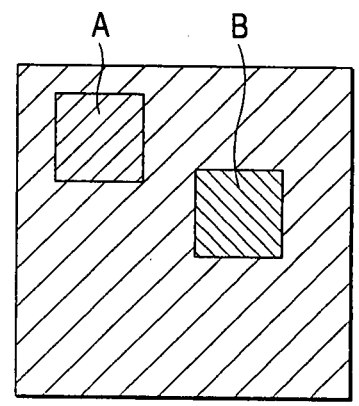
Figure 16D:
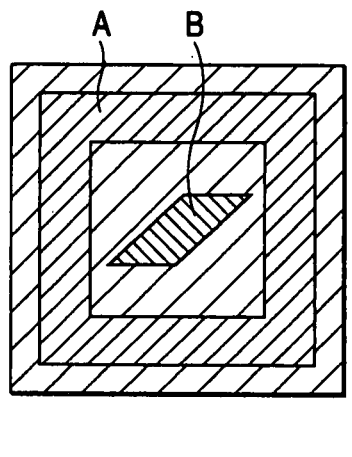
Figure 16E:
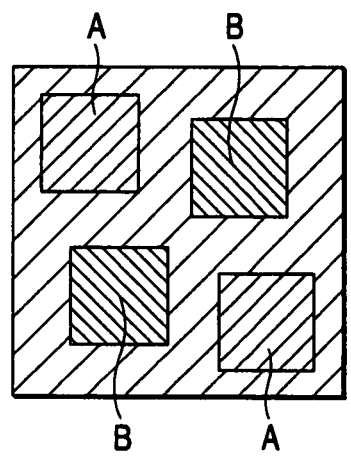
Figure 16F:
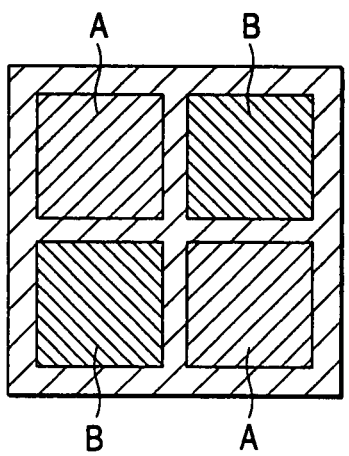
Figure 16G:
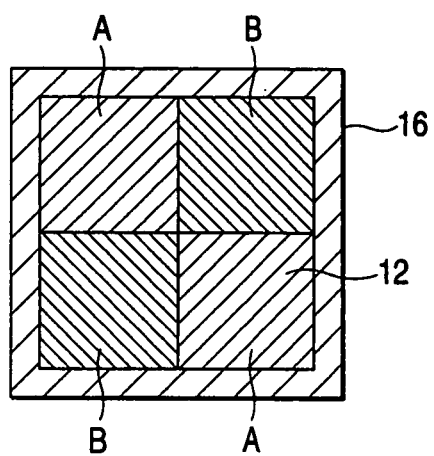

Alternatively, a section shape as shown in FIG. 15 in which circles and/or ellipses, and plural kinds of polygons are arranged so as to be contacted with one another may be used.

FIG. 15 is a sectional diagram showing an example of the section shape of a multiphase flow formed by the microchannel device of the invention.

The section shape of the multiphase flow shown in FIG. 15 shows an example in which nine hexagons, six rectangles, and four ellipses are arranged, each of the ellipses is inscribed in a hexagons formed by four hexagons and two rectangles, and three different fluids A to C flow through the hexagons, the rectangles, and the ellipses, respectively. A section shape of the multiphase flow such as shown in FIG. 15 is a shape which satisfies both the polygon arrangement shape and the circle inscribing/circumscribing shape.

In the microchannel device of the invention, a part of the section shape of the multiphase flow is (1) the polygon arrangement shape, (2) the circle inscribing/circumscribing shape, or (3) the circle arrangement shape. For example, a mode in which only a center portion of the section shape of the multiphase flow is the polygon arrangement shape, that in which the section shape of the whole multiphase flow is the polygon arrangement shape, that in which only a center portion of the section shape of the multiphase flow is the circle inscribing/circumscribing shape, that in which the section shape of the whole multiphase flow is the circle inscribing/ circumscribing shape, that in which only a center portion of the section shape of the multiphase flow is the circle arrangement shape, or that in which the section shape of the whole multiphase flow is the circle arrangement shape may be employed. Furthermore, it is matter of course that the polygons which are inscribed in or circumscribe a circle or an ellipse may be arranged in the polygon arrangement shape, or that the circle arrangement shape may be further inscribed in or circumscribes a circle, an ellipse, or a polygon.

FIG. 16 shows an example of a structure for forming the multiphase flow of the microchannel device of the invention (hereinafter, such a structure is often referred to as "multiphase-flow forming structure").

FIG. 16 is an enlarged diagram showing the multiphase-flow forming structure in an example of the microchannel device of the invention.

The section shape of the multiphase flow shown in FIG. 16 shows an example in which 2×2 tetragons are arranged vertically and horizontally, and two different fluids A and B flow through the tetragons.

The right figure in FIG. 16 is a schematic sectional view of the multiphase-flow forming structure in which the solid lines showing channels of the fluids A and B are in the front side of the plane of the paper, and the broken lines are in the back side of the plane of the paper.

The six left figures in FIG. 16 are sectional views taken along planes at a-a to f-f and perpendicular to the flow direction in the sight figure.

In the a-a sectional view in FIG. 16, the fluids A and B flow through two channels which are separated from each other by the structural material portion 16. Hereinafter, a channel through which the fluid A flows is often referred to as a channel A, and a channel through which the fluid B flows is often referred to as a channel B.

Between the a-a sectional view and the b-b sectional view, channel diameters of the channels A and B are reduced, the sections have rectangular shapes, the channel B moves to the inside of the microchannel device, and the channel A moves to the outside with respect to the channel B, with the result that the b-b sectional view in FIG. 16 is obtained.

Between the b-b sectional view and the c-c sectional view, the channel A is changed from the rectangular shape to a rectangular doughnut shape, and the channel B has a rectangular shape in the doughnut shape, with the result that the c-c sectional view in FIG. 16 is obtained.

Between the c-c sectional view and the d-d sectional view, each of the channels A and B branches into two channels (channels A1, A2, B1, and B2) to form two rectangular channels (the channels A1 and A2) through which a diagonal line of the tetragon of the outer shape of the microchannel device passes, and two rectangular channels (the channels B1 and B2) through which the other diagonal line passes, with the result that the d-d sectional view in FIG. 16 is obtained.

Between the d-d sectional view and the e-e sectional view, the channels A1 and A2 move to the inside of the microchannel device, the channels B1 and B2 moves to the outside of the microchannel device, and the thickness of the microchannel structural material portion among the channels is evenly adjusted, with the result that the e-e sectional view in FIG. 16 is obtained.

Between the e-e sectional view and the f-f sectional view, the sidewall width made by structural material portion 16 among the channels A1, A2, B1, and B2 becomes narrower, and the sidewall width made by structural material portion 16 is equal to or less than the width which a multiphase flow can be formed, with the result that a multiphase flow having a section shape where 2×2 tetragons are arranged vertically and horizontally such as shown in the f-f sectional view in FIG. 16 is formed. In this way, the section shape of the multiphase flow in the microchannel is identical with the shape on the extreme downstream side of the multiphase-flow forming structure (the shape of the outlet for the fluids, the f-f sectional view in FIG. 16).

Preferably, the above-mentioned width at which a multiphase flow can be formed, i.e., the width of the structural material which separates the microchannels from one another immediately before the formation of the multiphase flow is 10 to 1,000 μm. When the minimum strength required in structure is maintained, it is preferable to set the width to be as small as possible. When the strength is within the above-mentioned range, the portion of the multiphase-flow forming structure in the microchannel device has a sufficient strength, and flow disturbance or the like does not occur in the formation of the multiphase flow. Therefore, the range is preferable.

Preferably, the microchannel device of the invention has a channel branching portion.

The channel branching portion is a portion where one or more microchannels are branched to increase the number of channels. As shown in FIG. 16 which has been described, a channel branching structure may be disposed as a part of the multiphase-flow forming structure in the microchannel device. An example of the channel branching structure is the portion corresponding to the a-a to d-d sectional views in FIG. 16.

In the channel branching structure, preferably, at least a part has a fractal structure.

A fractal structure is a structure in which a self-similar geometrical structure is repeated. For example, the case where one channel A is branched into two channels A1 and A2, and each of the two channels is further branched into two channels, or the channel A1 is branched into two channels A11 and A12 and the channel A2 is branched into two channels A21 and A22 will be considered. In this case, when the structure in which the channel A is branched into the channels A1 and A2, that in which the channel A1 is branched into the channels A11 and A12, and that in which the channel A2 is branched into the channels A21 and A22 are similar to one another, it can be said that the whole branching structure is a fractal structure.

Preferably, the multiphase flow in the microchannel device of the invention has a flow rate adjusting layer between the multiphase flow in which the section shape is the polygon arrangement shape or the circle inscribing/circumscribing shape, and the inner wall of the microchannel.

Figure 17:
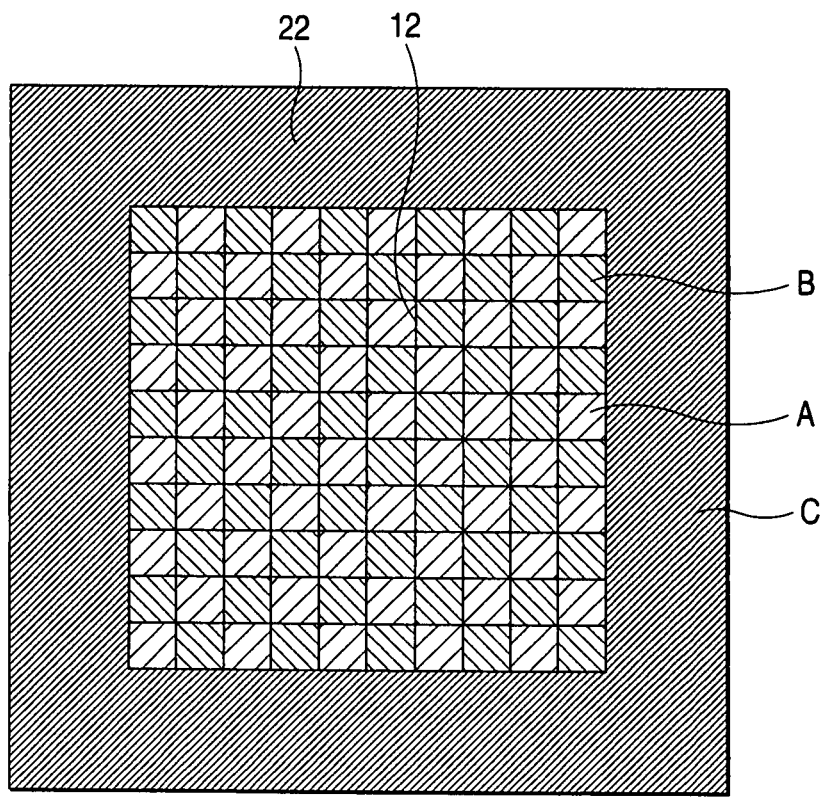
FIG. 17 is a sectional diagram showing an example of the section shape of the multiphase flow having a flow rate adjusting layer formed by the microchannel device of the invention.

FIG. 17 is a sectional diagram showing an example of the section shape of the multiphase flow having a flow rate adjusting layer formed by the microchannel device of the invention.

Figure 18:
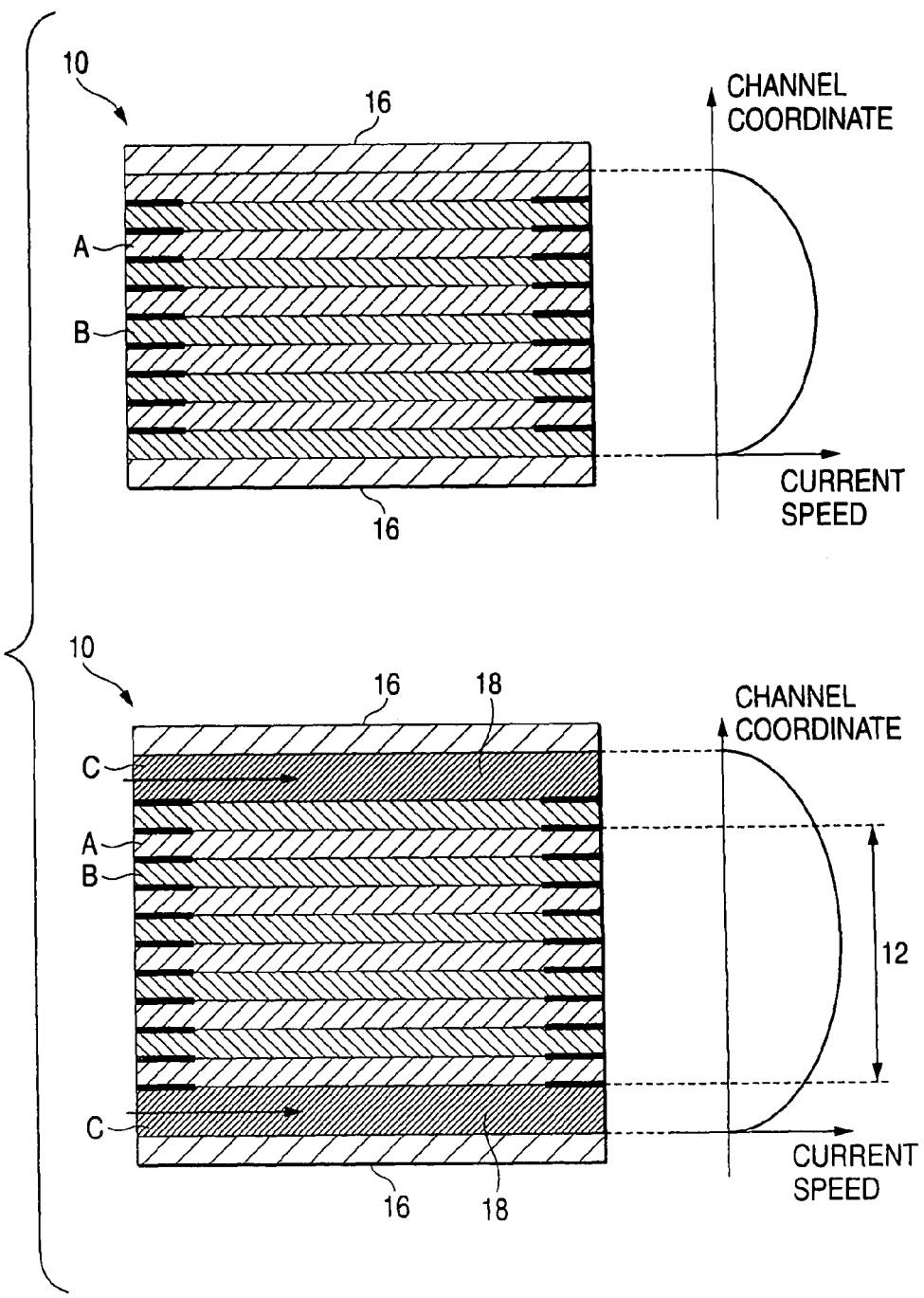
FIG. 18 is a diagram comparing an example of the microchannel device of the invention in which a multiphase flow having no flow rate adjusting layer is formed, with that of the microchannel device of the invention in which a multiphase flow having a flow rate adjusting layer is formed.

FIG. 18 is a diagram comparing an example of the microchannel device of the invention in which a multiphase flow having no flow rate adjusting layer is formed, with that of the microchannel device of the invention in which a multiphase flow having a flow rate adjusting layer is formed.

In the right side of FIG. 18, the flow rate and channel coordinate in the respective microchannels are diagrammatically shown as a graph while setting the flow rate and channel coordinate to the abscissa and ordinate, respectively.

In a microchannel, usually, the flow rate in the vicinity of the inner wall is affected by the inner wall to be reduced. As shown in FIGS. 17 and 18, the reduction of the flow rate in the vicinity of the inner wall is lessened by forming the flow rate adjusting layer 18, and the flow rate of the portion of the multiphase flow having the polygon arrangement shape 12 or the circle inscribing/circumscribing shape in which a desired reaction, mixture, or the like is performed can be prevented from being reduced. Therefore, the configuration is preferable.

The section shape of the flow rate adjusting layer is not particularly restricted, and a desired shape may be used as the section shape.

The thickness of the flow rate adjusting layer is preferably equal to or larger than the width of the channel of the portion of the multiphase flow having the polygon arrangement shape 12, the circle inscribing/circumscribing shape, or the circle arrangement shape. Preferably, the layer extends by 20 to 500 μm from the inner wall of the microchannel, and more preferably by 50 to 200 μm. When the thickness of the flow rate adjusting layer is increased within the range, the reduction of the flow rate by the inner wall of the microchannel can be further suppressed.

The fluid which is to flow through the flow rate adjusting layer is not particularly restricted as far as it does not react with the other fluids to be used, and is desired to have a viscosity which is equivalent to viscosities of the other fluids to be used. In the case of a reaction with aqueous material, for example, ion exchange water or ethanol is preferably used, and, in a biological system, physiological saline or the like is preferably used.

As a fluid which can flow through the microchannel device of the invention, a fluid other than a perfect liquid can be used. In accordance with usage, the fluid may contain a solid or a gas, and the composition, concentration, and the like of the fluid can be selected as required.

Examples of the material of the microchannel device of the invention are a metal, ceramic, glass, silicone, and a resin. Preferable examples are a metal and a resin, and a particularly preferable example is a member in which the surface of metal nickel is plated with gold.

As the resin, a resin which is suitable in shock resistance, heat resistance, chemical resistance, transparency, and the like for a reaction or unit operation to be performed is preferably used. Specifically, preferred examples are polyester resin, polystyrene resin, polyacrylic resin, styrene-acrylic copolymer, polysilicone resin, epoxy resin, diene resin, phenolic resin, terpene resin, coumarin resin, polyamide resin, polyamideimide resin, polyimide resin, polybutyral resin, polyurethane resin, ethylene-vinyl acetate copolymer, etc. More preferred examples are polyacrylic resin such as polymethylmethacrylate resin, and polystyrene resin. Preferably, the resin is a resin having a glass transition temperature. Preferably, the glass transition temperature of the resin is in a range of 90 to 150° C., and, more preferably, in a range of 100 to 140° C.

At least a part of the microchannel in the microchannel device of the invention is requested to be a microscale channel. In the microchannel device of the invention, the width (channel diameter) of the narrowest channel portion is 5,000 μm or less, preferably in the range of 10 to 1,000 μm, and more preferably in the range of 30 to 500 μm. Preferably, the depth of the channel is in the range of 10 to 500 μm.

In the microchannel device of the invention, preferably, the channel diameter of the microchannel in a portion through which a multiphase flow having in at least one portion a section shape of (1) the polygon arrangement shape, (2) the circle inscribing/circumscribing shape, or (3) the circle arrangement shape flows is 20 to 500 μm, more preferably 50 to 200 μm.

Preferably, the length of the channel is as short as possible depending also on the shape of the channel to be formed. Practically, a range of 100 to 1,000 μm is preferable.

The shape of the microchannel is not particularly restricted. For example, the section shape in a direction perpendicular to the flow direction may have a desired shape such as a circle, an ellipse, or a polygon.

The size of the microchannel device can be adequately set in accordance with the purpose of use, but preferably is in the range of 1 to 100 $cm^2$, and more preferably in the range of 10 to 40 $cm^2$. The thickness of the microchannel device is preferably in the range of 2 to 30 mm, and more preferably in the range of 3 to 15 mm.

In accordance with usage, in addition to the above-described microchannel which forms two or more different fluids as a multiphase flow, the microchannel device of the invention may be applied for many functions: a portion having a function of reaction, mixture, separation, purification, analysis, washing, or the like.

As required, for example, the microchannel device of the invention may be provided with a liquid supply port for supplying a fluid to the microchannel device, a recovery port for recovering a fluid from the microchannel device, or the like.

In accordance with usage, plural microchannel devices of the invention may be combined with one another, or the microchannel device may be combined with an apparatus having a function of reaction, mixture, separation, purification, analysis, washing, or the like, a liquid supplying apparatus, a recovery apparatus, another microchannel device, or the like to suitably construct a microchemical system.

The method of producing the microchannel device of the invention is not particularly restricted. Preferred examples of the method are the methods disclosed in U.S. Pat. No. 6,245,249, JP-A-10-305488, JP-A-2000-238000, JP-A-2004-223637, and the like. Specifically, preferred examples are as follows; a method of producing the microchannel device of the invention characterized in that it includes a first step of forming thin film patterns having on a substrate, which is called "Donor Substrate", and a second step of bonding and transferring the patterns from the Donor substrate to an opposed substrate, which is called "Target Substrate" continuously, thereby forming a microstructure; and a method of producing the microchannel device of the invention characterized in that, in a method of producing a microstructure in which processes of positioning, press contacting, and transferring from target substrate to donor substrate, are repeated to produce a microstructure in which the patterns are stacked and bonded onto the target substrate, a relative position between the donor substrate and the target substrate is detected, and the positioning process is performed on the basis of the relative position.

Hereinafter, as a preferred embodiment in which the microchannel device of the invention is used, pigment synthesis will be described. The term "Unit" used in the following description means "weight of unit quantity".
(Pigment Synthesis (Acid Pasting))

Figure 19:
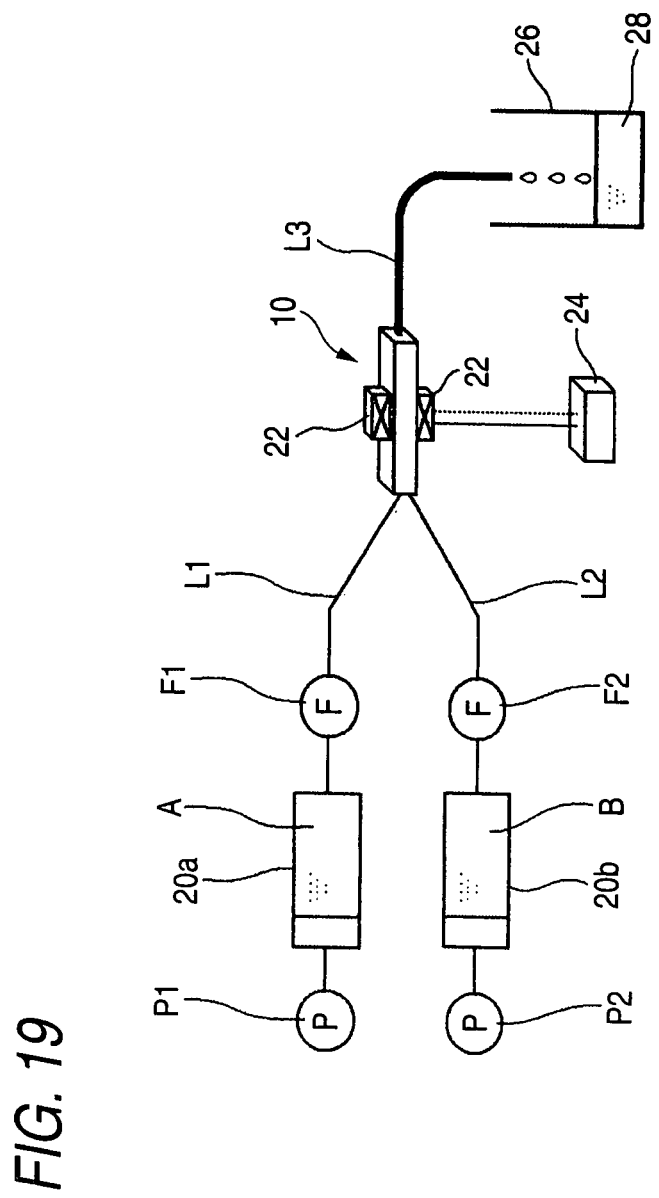
FIG. 19 is a schematic diagram showing an example of a treatment apparatus which can be suitably employed in an acid pasting treatment method using the microchannel device of the invention.

FIG. 19 is a schematic diagram showing an example of a treatment apparatus which can be suitably employed in an acid pasting treatment method using the microchannel device of the invention.

The acid pasting treatment apparatus shown in FIG. 19 comprises: a first channel L1 through which a fluid A (first fluid) containing water or an alkaline solution is passed; a second channel L2 through which a fluid B (second fluid) containing a pigment for a charge generating material, and an acid which dissolves the pigment; the microchannel device 10 which is connected to end portions of the channels L1, L2, and which causes the fluids A and B to merge to form a laminar flow; and a channel L3. A microsyringe 20a which stores the fluid A is connected to the upstream end of the channel L1, and a microsyringe 20b which stores the fluid B is connected to the upstream end of the channel L2.

As described above, the fluid A is a solution containing water or an alkaline solution, preferably a solution containing a concentrated alkaline solution. As the water contained in the fluid A, ion exchange water, pure water, or purified water such as distilled water is preferably used. Examples of the alkaline solution are ammonia water, an aqueous solution of sodium hydroxide, an aqueous solution of potassium hydroxide, and the like. Among the examples, ammonia water is preferable.

An organic solvent can be mixed in the first fluid A. When an organic solvent is mixed, the crystal form, and the quality of the pigment can be controlled more easily. As the organic solvent, known solvents can be used.

The second fluid B contains a pigment for a charge generating material, and an acid which dissolves the pigment.

Examples of the pigment for a charge generating material are known organic pigments such as a polycyclic quinone pigment, a perylene pigment, an azo pigment, an indigo pigment, a quinacridone pigment, and a phthalocyanine pigment.

Although not particularly restricted, examples of a phthalocyanine pigment are a metal-free phthalocyanine pigment, a titanyl phthalocyanine pigment, a copper phthalocyanine pigment, a chlorogallium phthalocyanine pigment, a hydroxygallium phthalocyanine pigment, a vanadyl phthalocyanine pigment, a chloroindium phthalocyanine pigment, and a dichlorotin phthalocyanine pigment.

Among the pigments, a phthalocyanine pigment in which the photosensitive wavelength range is extended to the near-infrared region of a semiconductor laser has been already practically used as a charge generating material of a digital recording photosensitive member of a laser printer, a full-color copier, or the like.

Although not particularly restricted, examples of a phthalocyanine pigment are a metal-free phthalocyanine pigment, a titanyl phthalocyanine pigment, a copper phthalocyanine pigment, a chlorogallium phthalocyanine pigment, a hydroxygallium phthalocyanine pigment, a vanadyl phthalocyanine pigment, a chloroindium phthalocyanine pigment, and a dichlorotin phthalocyanine pigment.

Among the phthalocyanine pigments, for example, the hydroxygallium phthalocyanine pigment (crude crystals) can be produced by; the method in which o-phthalodinitrile or 1,3-diiminoisoindoline is reacted with gallium trichloride in a predetermined solvent (the I-type chlorogallium phthalocyanine is method); or that in which o-phthalodinitrile, alkoxygallium, and ethylene glycol are heated in a predetermined solvent to be reacted with one another, thereby synthesizing phthalocyanine dimer (the phthalocyanine dimer method).

As the solvent in the reaction, preferably useful are inert and high-boiling point solvents such as α-chloronaphthalene, β-chloronaphthalene, α-methylnaphthalene, methoxynaphthalene, dimethylaminoethanol, diphenylethane, ethylene glycol, dialkyl ether, quinoline, sulfolane, dichlorobenzene, dimethylformamide, dimethylsulfoxide, and dimethylsulfoamide.

Examples of an acid are known acids such as sulfuric acid, nitric acid, hydrochloric acid, and trifluoroacetic acid. Among the acids, sulfuric acid is preferable because it can easily dissolve the pigment. More preferably, concentrated sulfuric acid of 95 or more wt % is used.

The mixing ratio of the pigment and acid contained in the second fluid B is preferably set to 10 to 1,000 weight units with respect to 1 weight part of the pigment, and more preferably 15 to 100 weight units. When the mixing ratio of the pigment and acid is within the range, the pigment sufficiently dissolves, and recrystallization is easily performed. Preferably, the temperature at which the pigment dissolves in the acid is 100° C. or lower, and more preferably 10 to 80° C. It is preferable that the liquid viscosity of the second fluid B is 250 mPa·s or less.

In the formation of the microchannel device 10 of the invention shown in FIG. 19 which can be suitably used in the acid pasting treatment apparatus, it is preferable to use the technique disclosed in JP-A-2004-223637. As the method of preparing a donor substrate which is required in the technique, there are the method in which the LIGA technique using X-rays is employed, that in which a resist portion is used as a structure by the photolithography method, that in which a resist opening is etched, the microdischarge machining method, the laser machining method, and the mechanical microcutting method in which a microtool made of a hard material such as diamond is used. These techniques may be used singly or combinedly.

A preferred example of the method of producing a donor substrate which is used in the production of the microchannel device of the invention is the Au surface coating Ni electroforming method shown in FIG. 20.

FIG. 20 is sectional and enlarged sectional views showing an example of steps of producing pattern layers on a donor substrate by the Au surface coating Ni electroforming method.

As shown in (A) of FIG. 20, a stainless steel substrate is prepared and washed. Next, as shown in (B) of FIG. 20, a photographic negative film resist of 30 μm is formed on the stainless steel substrate. As shown in (C) of FIG. 20, exposing and developing processes are performed on the resist to form a reverse pattern having a desired pattern layer shape on the stainless steel substrate. As shown in (D) of FIG. 20, Au plating of 2 μm is grown in portions where the stainless steel is exposed, and, as shown in (E) of FIG. 20, Ni electroplating of 22 μm is grown on the Au electroplating. Then, as shown in (F) of FIG. 20, a portion of the resist which extends by 29 μm from the surface is removed away by oxygen plasma etching (ashing), and, as shown in (G) of FIG. 20, Au electroplating is further grown by 1 μm on the surfaces of the electorplated Ni and Au patterns. Finally, as shown in (H) of FIG. 20, the remaining resist is removed away, and a Ni electroplated patterns in which the surface is coated by the Au electroplating is obtained at a total thickness of 25 μm. In FIG. 20, (I) is a view in which the portion of the Ni electroplated patterns in (H) of FIG. 20 is enlarged. Alternatively, the resist may not be completely removed away, and the donor substrate may be used in the state of (G) of FIG. 20.

In the method shown in FIG. 20, the structure in which the whole face of the Ni pattern is coated by Au, and which has excellent corrosion resistance can be economically obtained. Therefore, the method is preferable.

Figure 21:
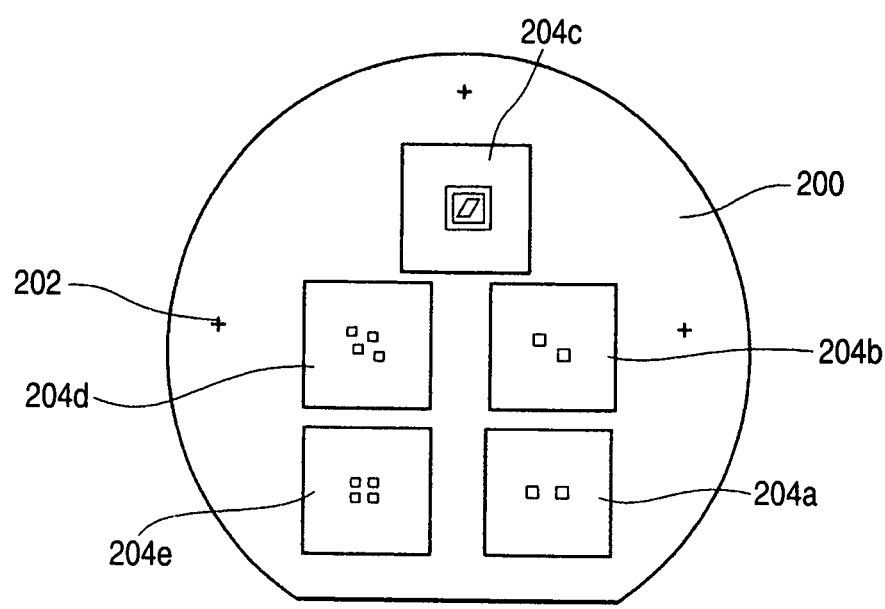
FIG. 21 is a diagram showing an example of a donor substrate having pattern layers.

According to the method, for example, a donor substrate shown in FIG. 21 can be produced.

FIG. 21 is a diagram showing an example of a donor substrate having pattern layers.

In the donor substrate 200 shown in FIG. 21, first to fifth pattern layers 204a to 204e are formed, and fiducially marks 202 which will be used in positioning during a bonding process are disposed.

Next, the donor substrate, a target substrate, and the whole of the stage are placed in a vacuum chamber, and the vacuum chamber is set to a vacuum of $10^{-5}$ Pa. The donor substrate and the target substrate are irradiated with FAB (Fast Atom Beam) consisting of neutral atom beams of Ar, and the surfaces are cleaned and activated.

FIG. 22 is a diagram showing a step of transferring the patterns.

Figure 22A:
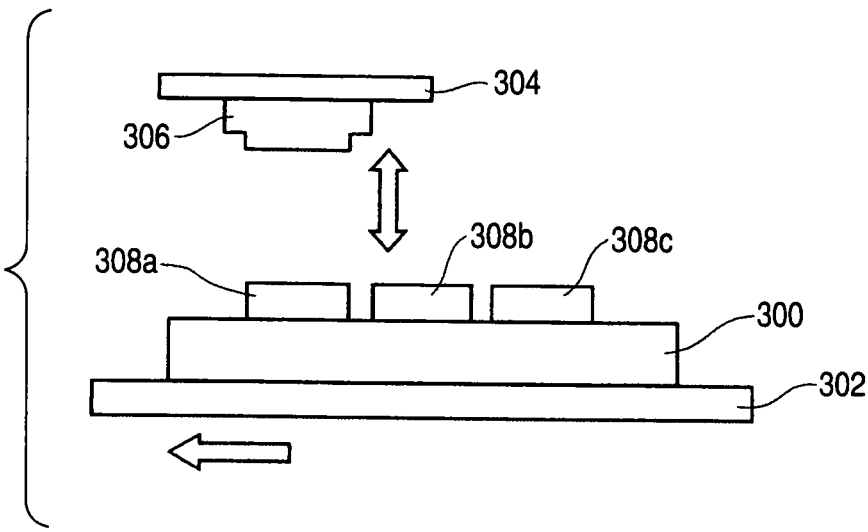
FIGS. 22A and 22B are diagrams showing a step (transferring step) of bonding the pattern layers.

As shown in FIG. 22(A), while positioning the target substrate 306 with respect to the first pattern layer 308a, the target substrate 306 is vertically lowered to cause the first pattern layer 308a to be contacted with the target substrate 306. The substrate is pressed at a load of 50 kgf/cm² for five minutes to bond the target substrate 306 and the first pattern layer 308a together. At this time, the bonding strength is 5 to 10 MPa.

Figure 22B:
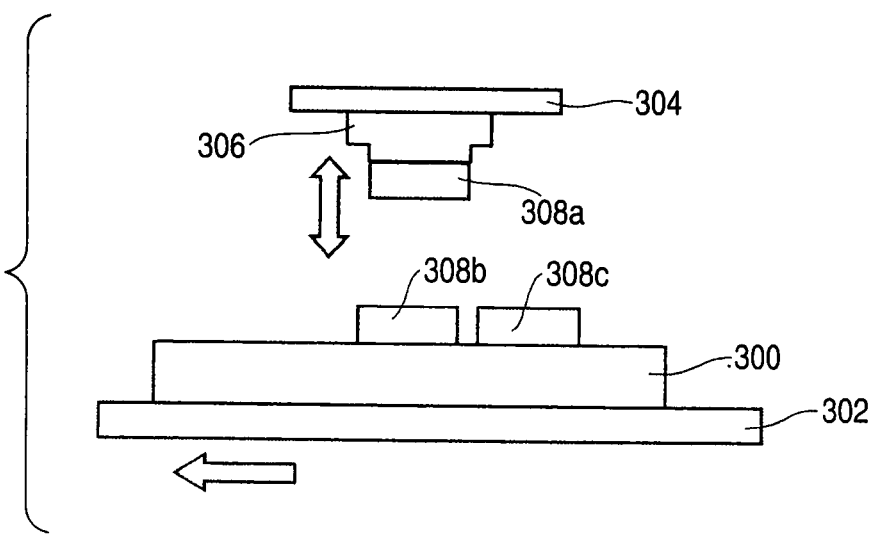

When the target substrate 306 is vertically raised, the first pattern layer 308a is transferred onto the target substrate 306 as shown in FIG. 22(B). In this way, the pattern layer 308a can be transferred from the donor substrate 300 to the side of the target substrate 306 because the adhesive force between the pattern layer 308a and the target substrate 306 is larger than that between the pattern layer 308a and the donor substrate 300. Next, in order to irradiate the first and second pattern layers 308a, 308b with FAB, the flat stage is moved. The rear face of the first pattern layer 308a (the face which has been contacted with the donor substrate 300) is irradiated with FAB, and the surface of the second pattern layer 308b is irradiated with FAB. The first pattern layer 308a and the second pattern layer 308b are bonded together.

These operations are repeated a desired number of times, and the transferring process is ended, with the result that a microchannel device is obtained.

Alternatively, the target substrate may be once separated from the opposing stage, the substrate may be again fixed to the opposing stage while being vertically inverted, and then similar operations of bonding the pattern layer may be performed.

Alternatively, a pipe which is obtained by a known machining process, and which is circular, rectangular, or the like may be cut in a desired length, and then bonded to the pattern layer, thereby forming a microchannel device.

An example of the microchannel device of the invention which can be suitably employed in the acid pasting treatment method will be described.

Figure 23:
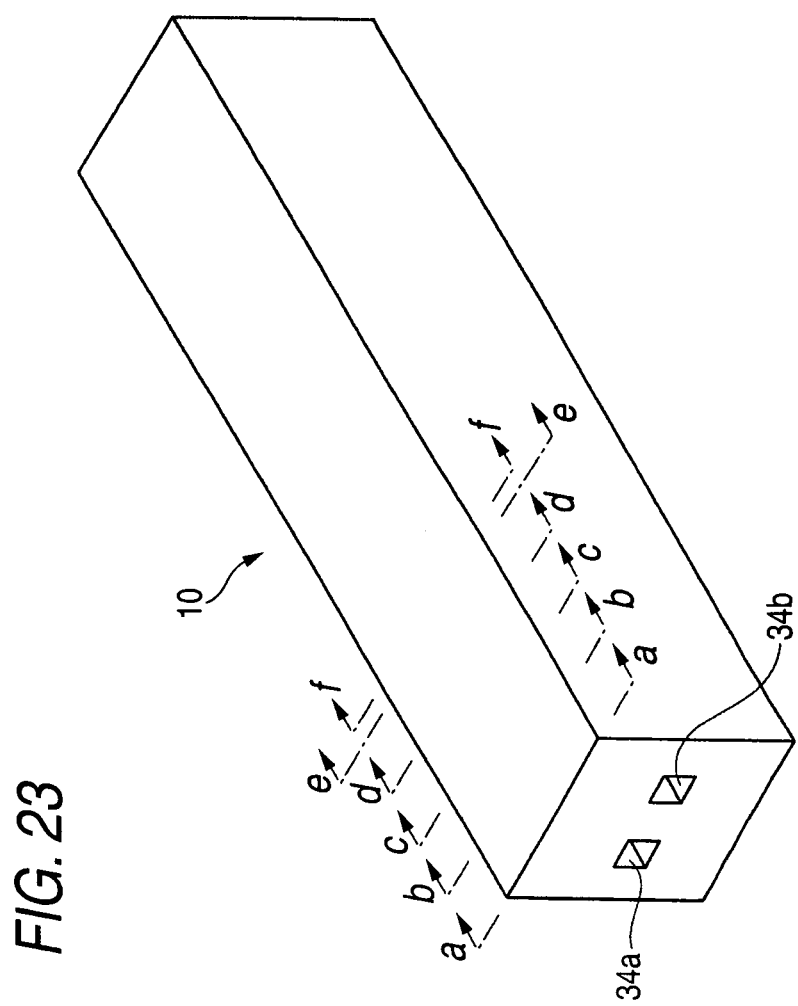
FIG. 23 is a schematic perspective view showing an example of the microchannel device of the invention.
Figure 24:
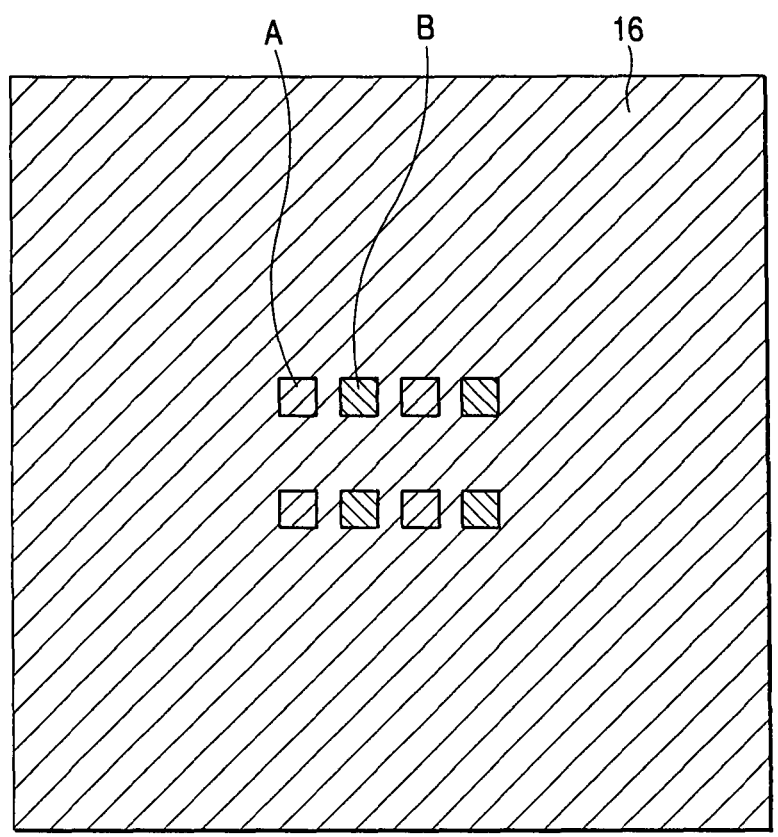
FIG. 24 is an a-a sectional view of the microchannel device shown in FIG. 23.
Figure 25:
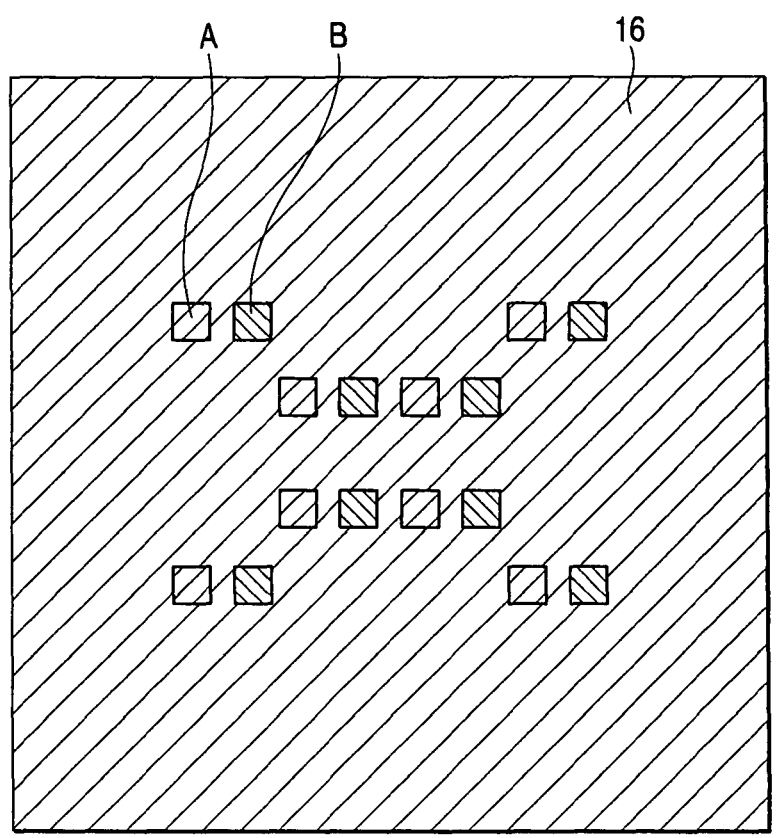
FIG. 25 is a b-b sectional view of the microchannel device shown in FIG. 23.

FIG. 23 is a schematic perspective view showing an example of the microchannel device of the invention.

The external shape of the microchannel device shown in FIG. 23 is a rectangular parallelepiped of 20 mm×20 mm×250 mm. Two channel connecting portions 34a, 34b are disposed in one of faces of 20 mm×20 mm, and one channel connecting portion (not shown) is disposed in the other face of 20 mm×20 mm.

The microchannel device 10 shown in FIG. 23 has an internal structure in which two channels connected to the two channel connecting portions 34a, 34b are branched so as to be alternatingly formed as 200 channels, respectively, thereby forming a multiphase flow having a section shape in which 20×20 squares are arranged.

FIGS. 24 to 29 are a-a to f-f sectional views of the microchannel device shown in FIG. 23, respectively.

Figure 26:
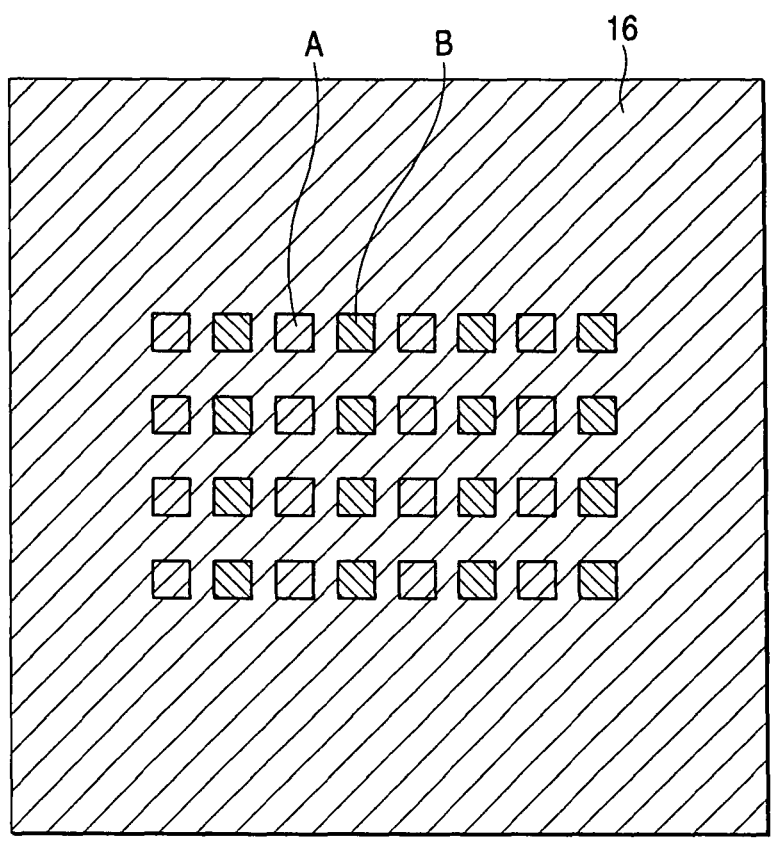
FIG. 26 is a c-c sectional view of the microchannel device shown in FIG. 23.
Figure 27:
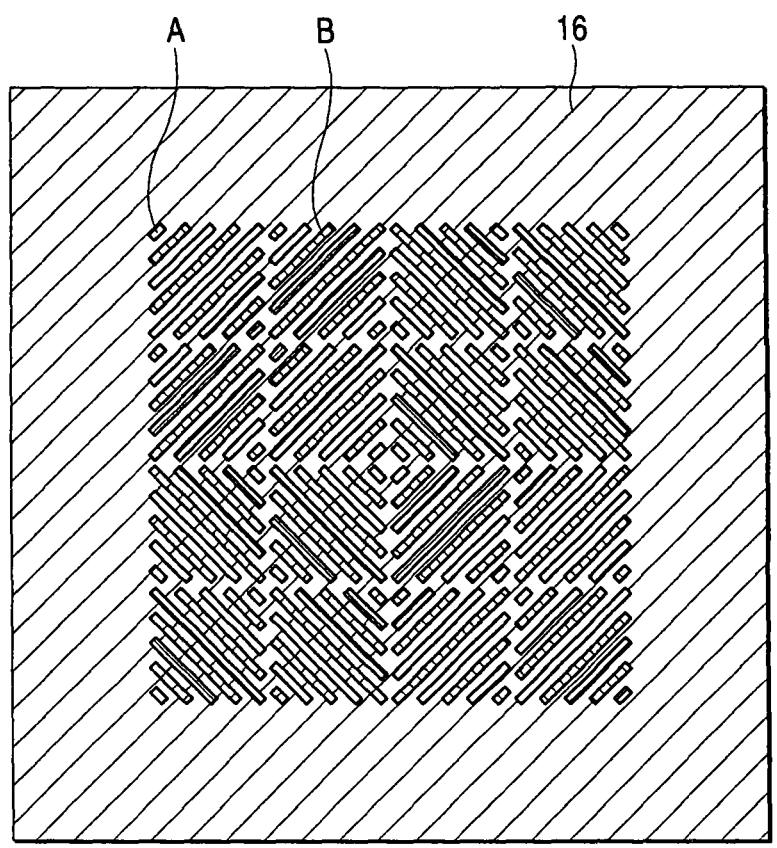
FIG. 27 is a d-d sectional view of the microchannel device shown in FIG. 23.
Figure 28:
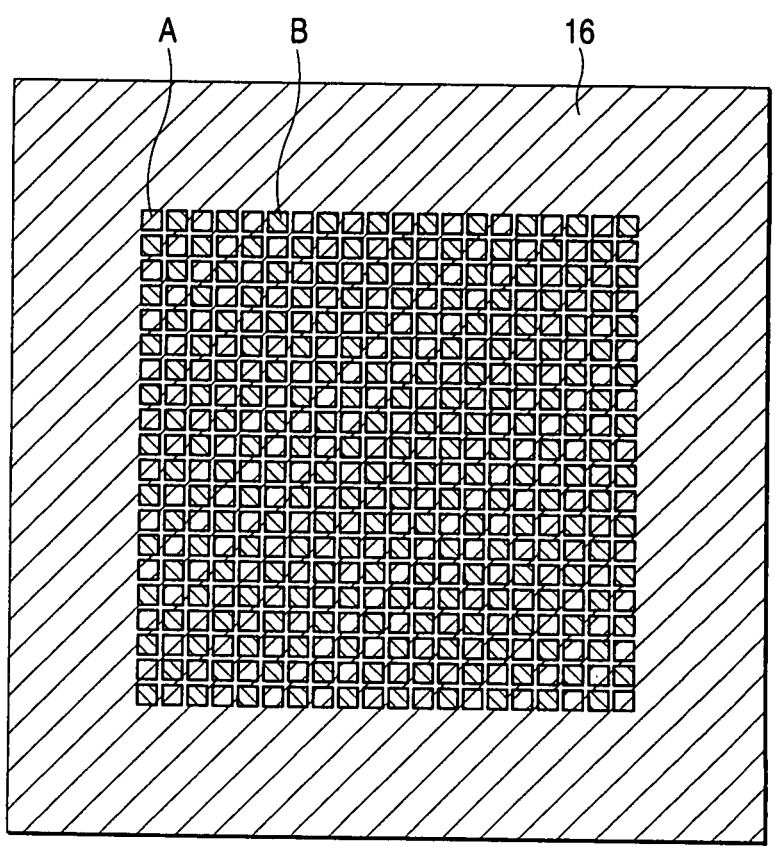
FIG. 28 is an e-e sectional view of the microchannel device shown in FIG. 23.
Figure 29:
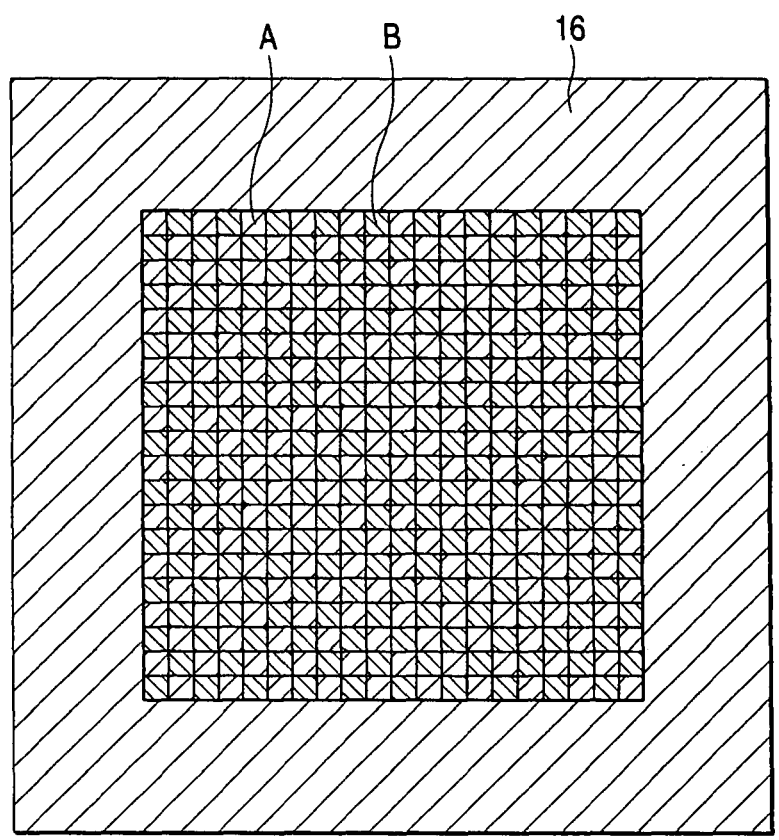
FIG. 29 is an f-f sectional view of the microchannel device shown in FIG. 23.

The two channels connected to the two channel connecting portions 34a, 34b are branched into two respective channels to form four channels in total (FIG. 24, the a-a sectional view), and further branched into eight channels in total (FIG. 25, the b-b sectional view), and into sixteen channels in total (FIG. 26, the c-c sectional view). Furthermore, each pair of two channels passes the shape of the d-d sectional view shown in FIG. 27, so that 400 channels in total are formed (FIG. 28, the e-e sectional view). In the used microchannel device 10, the channels in the vicinity of the formation of a laminar flow are formed as squares of a size of 400 μm×400 μm, and the distances between the channels (the width of the structural material portion) are set to 50 μm. The channels of 20×20 or 400 in total flow into one channel, so that the portion which is downstream from the f-f sectional view shown in FIG. 29 is one channel that can form a multiphase flow in which 20×20 or 400 squares are arranged in vertically and horizontally (FIG. 29, the f-f sectional view).

A heater 22 is disposed in the microchannel device 10. The temperature of the heater is adjusted by a temperature controlling apparatus 24. As the heater 22, a metal resistor, polysilicon, or the like is used. The heater 22 may be incorporated in the microreactor. In order to perform the temperature control, the whole microreactor may be placed in a temperature-controlled vessel.

(Production of Crude Crystals of I-Type Hydroxygallium Phthalocyanine Pigment)

In 230 units of dimethylsulfoxide, 30 units of 3-diiminoisoindoline, and 9.1 units of gallium trichloride were reacted with each other at 160° C. for six hours while stirring, to obtain magenta crystals. The crystals were washed with dimethylsulfoxide, thereafter washed with ion exchange water, and then dried to obtain 28 units of crude crystals of I-type hydroxygallium phthalocyanine pigment.

(Acid Pasting Treatment)

An amount of 600 units of 25% aqueous solution of ammonia was mixed with 200 units of ion exchange water to obtain a solution A.

An amount of 10 units of crude crystals of I-type chlorogallium phthalocyanine pigment was mixed with so units of concentrated sulfuric acid having a concentration of 97%, and the crude crystals dissolved in the resulting solution while maintaining the temperature of the solution at 50° C., to obtain a solution B.

In the treatment apparatus shown in FIG. 19, the obtained solutions A and B were set into the microsyringes 20a, 20b having pumps P1, P2, respectively, and then supplied at a constant flow rate through filters F1, F2 to the microchannel device 10. In the microchannel device 10 which was set to 10° C. by the temperature controlling apparatus 24, an acid pasting treatment of a pigment was performed, and mixture liquid 28 containing recrystallized and precipitated I-type hydroxygallium phthalocyanine was recovered. The flow rate (liquid supply rate) was set to a value at which about 0.05 cc/hr per channel was attained before branching.

The obtained mixture liquid 28 was filtered, then washed with N,N-dimethylformamide and ion exchange water, and thereafter dried to obtain 8 units of I-type hydroxygallium phthalocyanine which is an acid pasting treatment product.

The dispersion of the BET specific surface area was measured, and results of the measurement showed that the mean particle size of the obtained pigment is uniform.

In the apparatus, a yield which is 400 times that of a conventional microreactor can be obtained at one time, and the increase of places where a fault occurs due to the numbering-up can be prevented from being increased.

Next, as another preferred embodiment in which the microchannel device of the invention is used, washing of particles will be described.
(Washing of Particles)
(Production of Aqueous Dispersion of Resin Particles)
A resin solution was produced in the following mixing ratios:

| Preparation of oil phase 1 | |
| --- | --- |
| polyester resin (weight-average molecular weight: 9,000) | 120 units |
| ethyl acetate | 60 units |

The above components were loaded into a homo-mixer (ACE HOMOGENIZER, a product of NIHONSEIKI KAISHA LTD.), and stirred at 15,000 rpm for two minutes to produce a homogenous solution, thereby preparing oil phase 1.

| Preparation of aqueous phase 1 | |
| --- | --- |
| calcium carbonate (volume mean particle size: 0.03 μm) | 60 units |
| pure water | 40 units |

The above components were mixed with each other, and stirred in a ball mill for four days, thereby preparing aqueous phase 1.

| Preparation of aqueous phase 2 | |
| --- | --- |
| caboxymethylcellulose (viscosity: 500 to 800 Pa · s) | 2 units |
| pure water | 98 units |

The above components were mixed with each other, thereby preparing aqueous phase 2.
Production of Aqueous Dispersion of Resin Particles The thus prepared oil phase 1, aqueous phase 1, and aqueous phase 2 were mixed and emulsified in the following ratios, to produce an aqueous dispersion of resin particles.

| oil phase 1 | 60 units |
| --- | --- |
| aqueous phase 1 | 10 units |
| aqueous phase 2 | 30 units |

(Washing of particles by using microchannel device)

Figure 30:
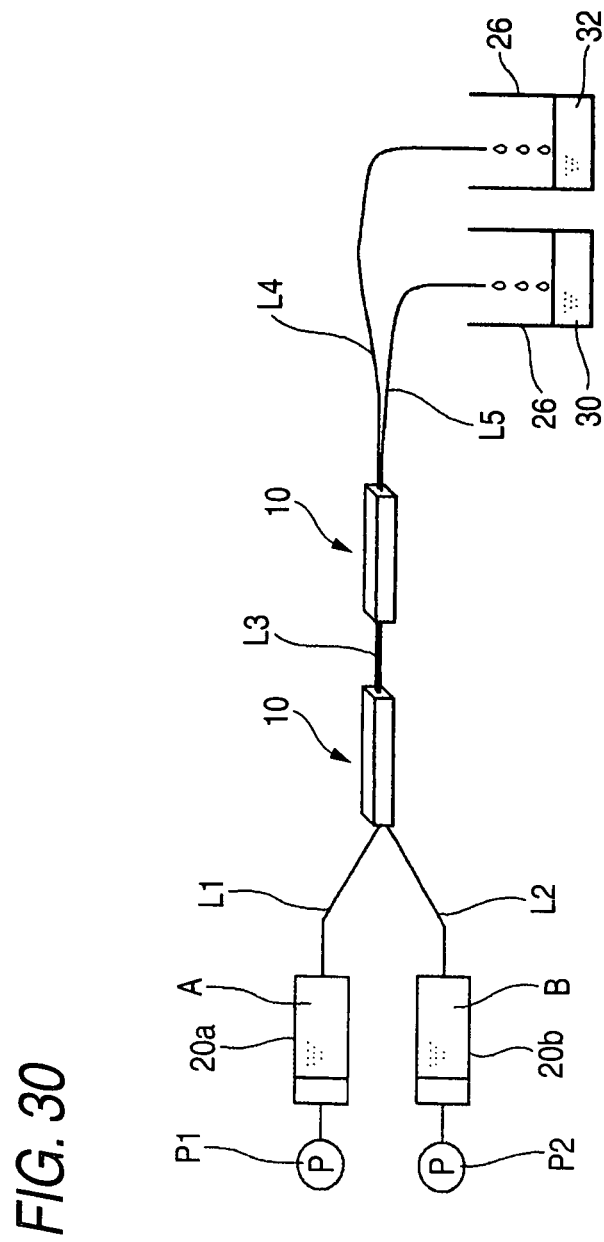
FIG. 30 is a schematic diagram showing an example of a washing apparatus which can be suitably employed in an article washing method using the microchannel device of the invention.

In a treatment apparatus shown in FIG. 30, an aqueous dispersion which was obtained by preparing the aqueous dispersion of resin particles so as to have a solid concentration of 20 volt with using pure water, and ion exchange water for washing were set into microsyringes 20a, 20b having pumps P1, P2, respectively, and then supplied at a constant flow rate to two microchannel devices 10 connected to each other. The two microchannel devices 10 are identical with the device used in the above-described acid pasting treatment method. The upstream microchannel device 10 was disposed in the direction along which a multiphase flow is formed from two channels, and the downstream microchannel device 10 was disposed in the direction along which two channels are formed from a multiphase flow. A channel L3 is a channel which maintains a multiphase flow as it is, and has a length of 80 mm. In the microchannel devices 10 which were set to 40° C. by a temperature controlling apparatus (not shown), particles were washed, and recovery washing liquid 30 and a recovery aqueous dispersion of resin particles 32 were recovered while they were separated from each other. The flow rates (liquid supply rates) were set to 80 cc/hr. As required, preferably, adequate filters may be disposed between the microsyringes 20a, 20b and the microchannel devices 10.

The resin particles which were obtained from the recovery aqueous dispersion of the resin particles 32 were sufficiently washed, and no leakage and loss of the resin particles occurred.

As a further preferred embodiment in which the microchannel device of the invention is used, pigment synthesis in which three liquids are mixed with one another will be described.

As the useful three liquids, the solutions A and B in the acid pasting treatment, and ion exchange water (solution C) that is a solvent from which pigments can be precipitated were used.

The solution C is not particularly restricted as far as it can precipitate a pigment. Examples of the solution are a diluted alkali solution, a diluted acid solution, and water. Particularly, water is preferably used. When water is used, a phthalocyanine pigment and a hydrated salt can be produced. The neutralization reaction can be suppressed to conditions which are milder than those in neutralization reaction with an alkali.

Figure 31:
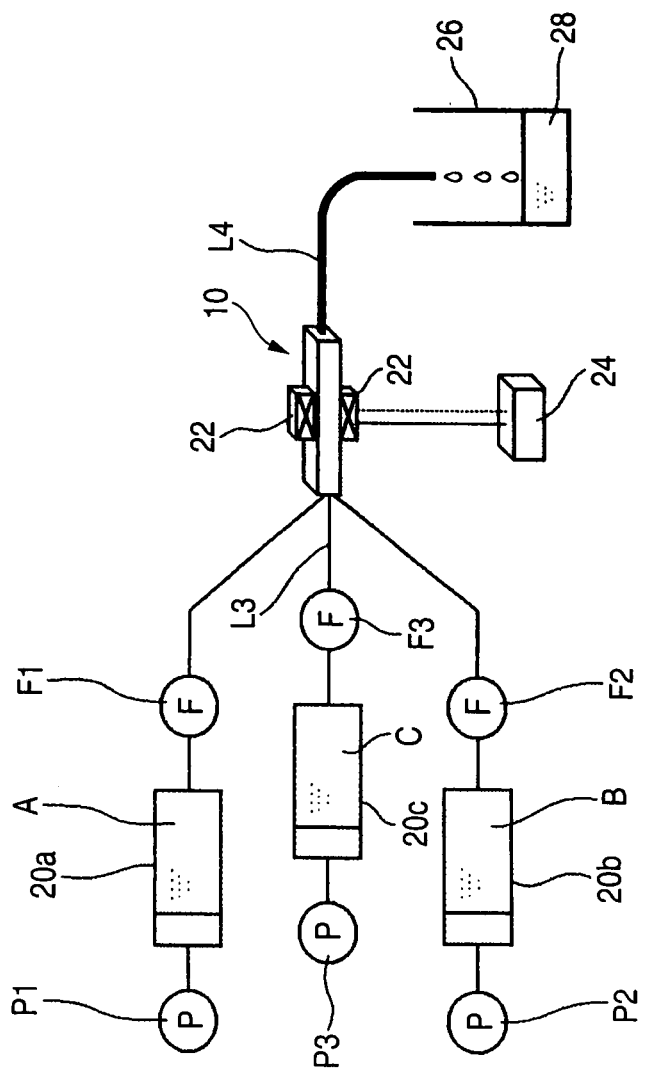
FIG. 31 is a schematic diagram showing another example of a treatment apparatus which can be suitably employed in an acid pasting treatment method using the microchannel device of the invention.

In a treatment apparatus shown in FIG. 31, the obtained solutions A, B, C were set into microsyringes 20a, 20b, 20c having pumps P1, P2, P3, respectively, and then supplied at a constant flow rate through filters P1, F2, F3 to a microchannel device 10. In the microchannel device 10 which was set to 10° C. by the temperature controlling apparatus 24, an acid pasting treatment of a pigment was performed, and mixture liquid 28 containing recrystallized and precipitated I-type hydroxygallium phthalocyanine was recovered. The flow rate (liquid supply rate) was set to a value at which about 0.05 cc/hr per channel was attained before branching.

The obtained mixture liquid 28 was filtered, then washed with N,N-dimethylformamide and ion exchange water, and thereafter dried to obtain I-type hydroxygallium phthalocyanine which is an acid pasting treatment product.

The dispersion of the BET specific surface area was measured, and results of the measurement showed that the mean particle size of the obtained pigment is uniform.

Figure 32:
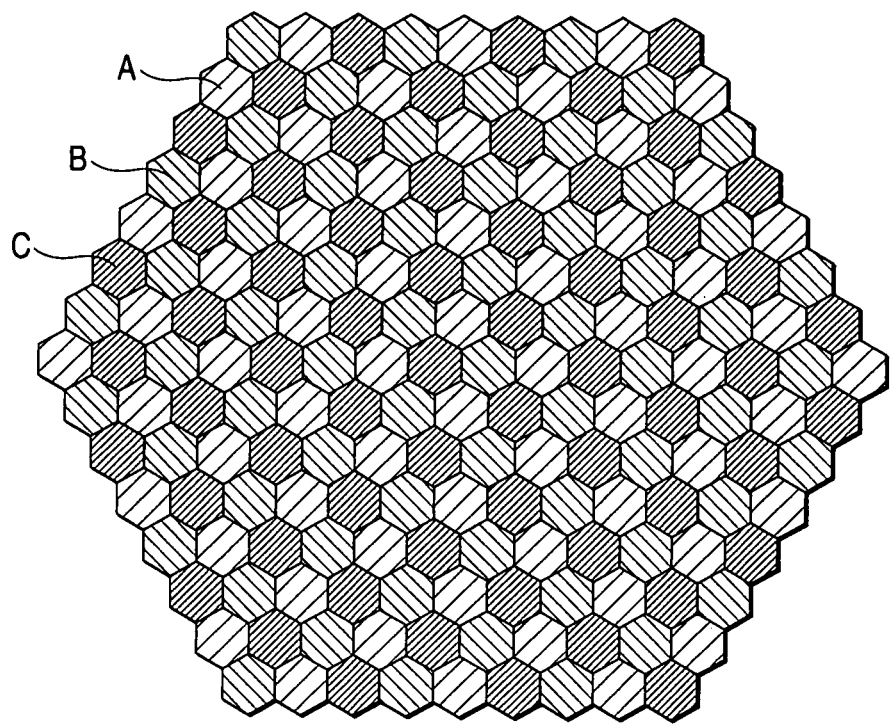
FIG. 32 is a sectional diagram showing another example of a section shape of a multiphase flow formed by the microchannel device of the invention.

In the microchannel device 10 used in the pigment synthesis in which three liquids are mixed with one another, each of three channels branches into 64 channels, and a multiphase flow in which 192 regular hexagons (having one side of 300 µm) shown in FIG. 32 are arranged vertically and horizontally can be formed. The external shape of the microchannel device 10 is a rectangular parallelepiped of 20 mm×20 mm×100 mm. The used microchannel device 10 was produced in a method similar to that described above.

Although preferred embodiments of the invention have been described, it is a matter of course that the invention is not restricted to them.

What is claimed is:

1. A microchannel device of a microreactor unit comprising:
    a plurality of micro channels that includes a first channel and a second channel; and
    a merging channel that is formed at a downstream side of the plurality of micro channels, wherein
    the first channel branches into a plurality of first branch channels with a first branch structure,
    the first branch channels each branch into a plurality of second branch channels with a second branch structure,
    the first branch structure and the second branch structure being similar,
    the second channel and the plurality of second branch channels are connected to the merging channel at the downstream side,
    the second channel and the plurality of second branch channels are not connected to each other, other than the merging channel,
    a diameter of the first channel is larger than a diameter of each of the plurality of first branch channels,
    the diameter of each of the plurality of first branch channels is larger than a diameter of each of the plurality of second branch channels,
    a diameter of the second channel is substantially constant,
    the second channel extends alongside the first channel, the plurality of first branch channels, and the plurality of second branch channels from an input end of the first channel to output ends of the plurality of second branch channels,
    the first and second channels each have a plurality of segments including an upstream segment and a downstream segment, and
    the upstream segment of each of the plurality of segments has a cross-sectional shape that is different than the downstream segment of each of the plurality of segments.

2. The microchannel device of claim 1, wherein the upstream segment has a rectangular shape and the downstream segment has a rectangular doughnut shape.

3. The microchannel device of claim 1, wherein the upstream segment has a diameter larger than a diameter of the downstream segment.

4. The microchannel device of claim 1, wherein the upstream segment has a sidewall width that is less narrow than a sidewall width of the downstream segment.

5. The microchannel device of claim 4, wherein the sidewall width of the downstream segment is equal to or less than a width in which a multiphase flow can be formed.

6. The microchannel device of claim 1, wherein the first branch structure and the second branch structure have substantially a same fractal structure.

* * * * *